US008953129B2

(12) United States Patent
Hara et al.

(10) Patent No.: US 8,953,129 B2
(45) Date of Patent: Feb. 10, 2015

(54) LIQUID CRYSTAL DEVICE AND PROJECTION-TYPE DISPLAY APPARATUS

(75) Inventors: Hiroyuki Hara, Suwa (JP); Tomoki Yokota, Chino (JP)

(73) Assignee: Seiko Epson Corporation, Tokyo (JP)

( * ) Notice: Subject to any disclaimer, the term of this patent is extended or adjusted under 35 U.S.C. 154(b) by 82 days.

(21) Appl. No.: 13/422,322

(22) Filed: Mar. 16, 2012

(65) Prior Publication Data

US 2012/0242914 A1 Sep. 27, 2012

(30) Foreign Application Priority Data

Mar. 22, 2011 (JP) ................. 2011-062554

(51) Int. Cl.
*G02F 1/1343* (2006.01)
*G02F 1/1339* (2006.01)
(52) U.S. Cl.
USPC ............ 349/139; 349/142; 349/153; 349/154
(58) Field of Classification Search
CPC .............. G02F 1/136259; G02F 2001/136272; G02F 2001/13629; G02F 2001/133388; G02F 2201/50; G02F 1/34309; G02F 1/1343; G02F 2001/13397; G02F 1/1341; G02F 2201/508; G02F 1/0045; G02F 1/55
See application file for complete search history.

(56) References Cited

U.S. PATENT DOCUMENTS

| | | | | |
|---|---|---|---|---|
| 2008/0055529 | A1* | 3/2008 | Shirasaka et al. | 349/143 |
| 2010/0103363 | A1* | 4/2010 | Shigekura et al. | 349/154 |
| 2010/0225632 | A1* | 9/2010 | Ma et al. | 345/211 |

FOREIGN PATENT DOCUMENTS

| | | |
|---|---|---|
| JP | 4-126617 A | 4/1992 |
| JP | 05-323336 A | 12/1993 |
| JP | 6-289408 | 10/1994 |
| JP | 2000-221521 A | 8/2000 |
| JP | 2008-058497 A | 3/2008 |
| JP | 2008-089938 A | 4/2008 |
| JP | 2009-092897 | 4/2009 |

* cited by examiner

*Primary Examiner* — Richard Kim
*Assistant Examiner* — Angela Davison
(74) *Attorney, Agent, or Firm* — ALG Intellectual Property, LLC

(57) ABSTRACT

In an element substrate of a liquid crystal device, in a peripheral region interposed between an image display region and a seal material, a peripheral electrode to which a potential is applied for trapping ionic impurities which is different from a common potential applied to a dummy pixel electrode or the like is formed. In the peripheral electrode, an electrode width of a first portion opposing a sealing material provided at a liquid crystal injection opening of the seal material is set to be greater than electrode widths of the other portions.

7 Claims, 10 Drawing Sheets

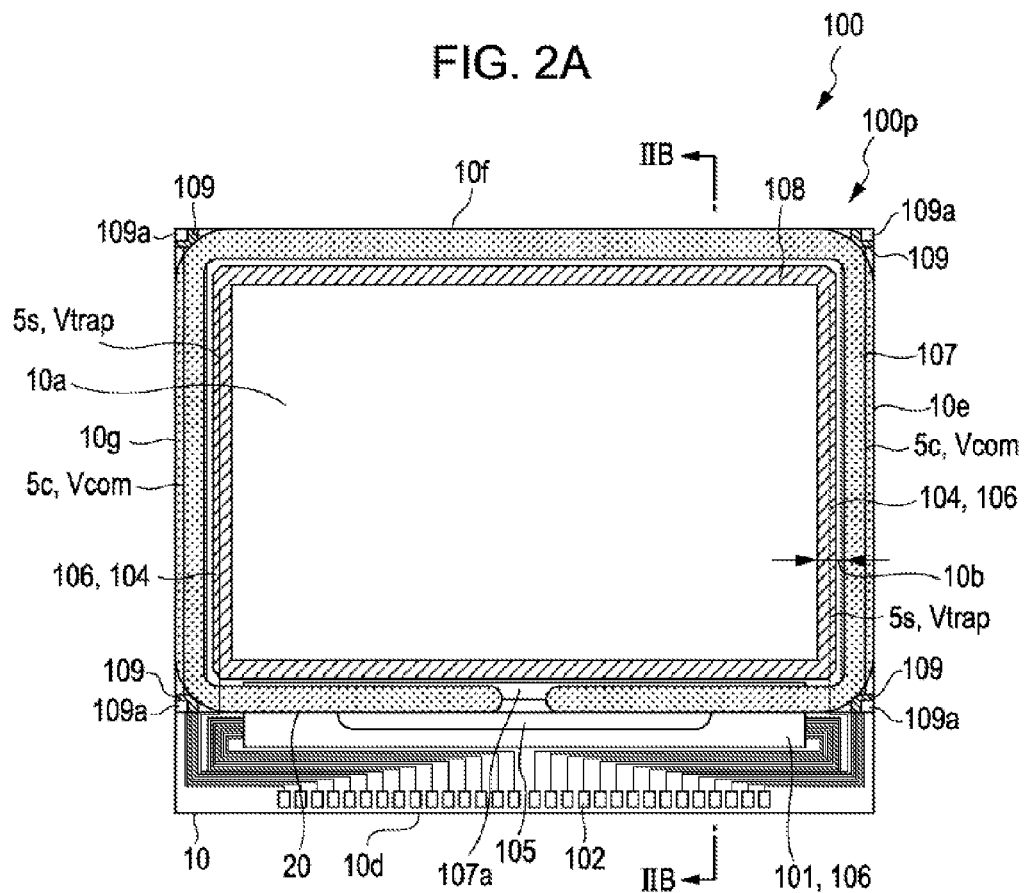
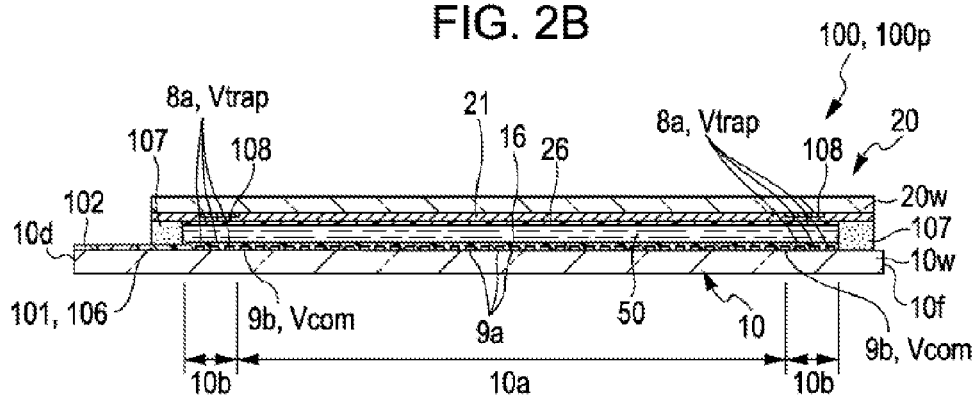

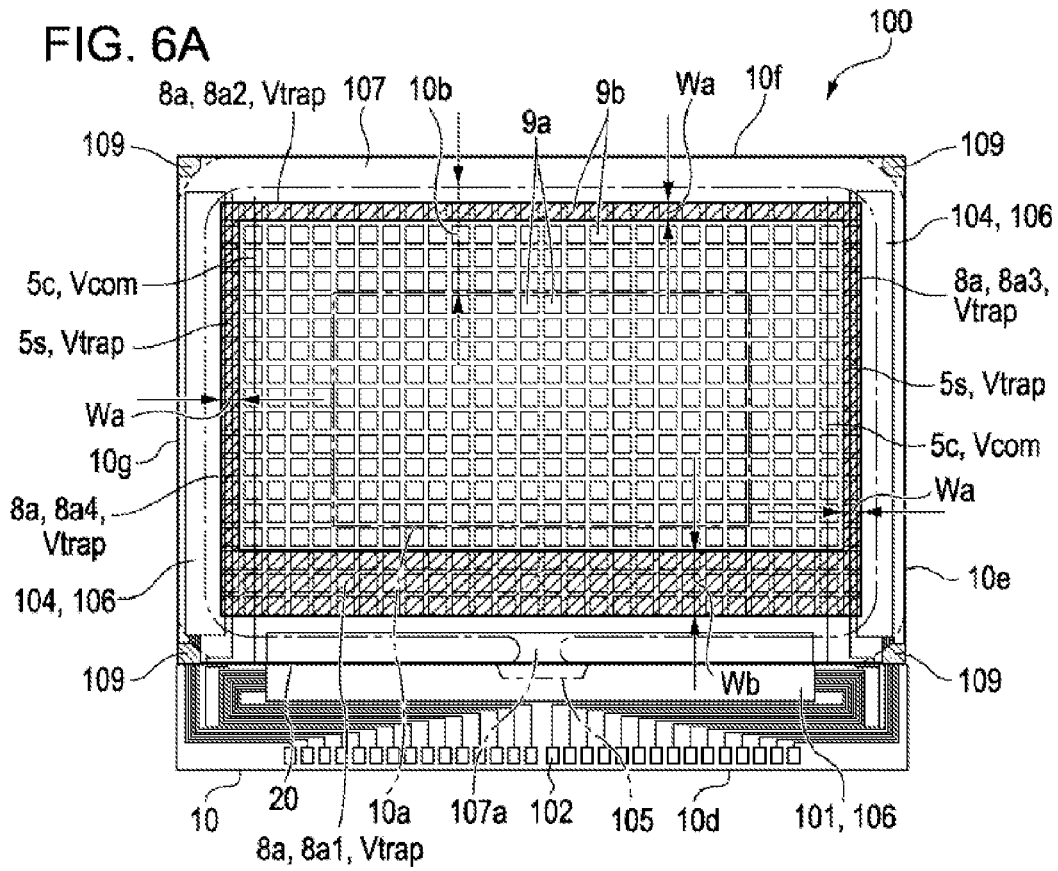
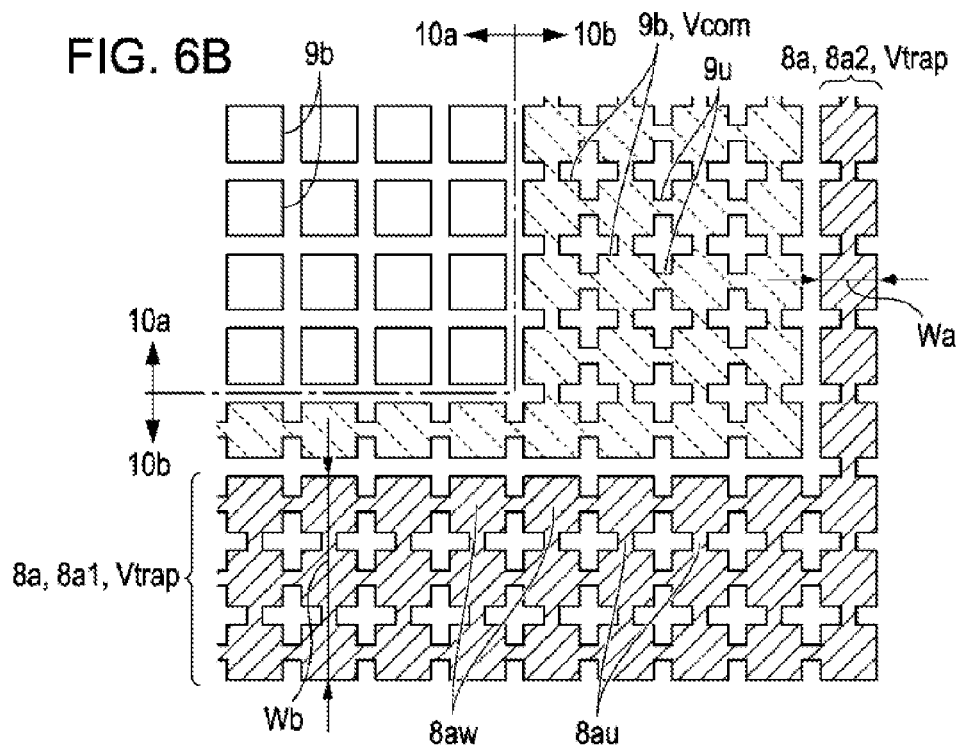

LIQUID CRYSTAL DEVICE AND PROJECTION-TYPE DISPLAY APPARATUS

BACKGROUND

1. Technical Field

The present invention relates to a liquid crystal device in which liquid crystals are held between a pair of substrates, and a projection-type display apparatus which uses the liquid crystal device as a light valve.

2. Related Art

In a liquid crystal device, an element substrate provided with an image display region having a plurality of pixel electrodes arranged on one surface side and a counter substrate provided with a common electrode to which a common potential is applied are bonded to each other by a seal material, and a liquid crystal layer is held in a region surrounded by the seal material between the element substrate and the counter substrate. In order to manufacture the liquid crystal device, first, when the seal material is applied to the element substrate in a frame form, a broken portion is provided, and after the element substrate and the counter substrate are overlapped with each other via the seal material, the seal material is cured. Then, a liquid crystal material is depressurized and injected between the element substrate and the counter substrate from the portion where the seal material is broken, a sealing material is applied to the broken portion, and the sealing material is cured.

In such a liquid crystal device, when ionic impurities infiltrating during liquid crystal injection or ionic impurities eluted from the seal material are aggregated in the image display region by driving the liquid crystal device, degradation of display quality such as burn-in (discoloration) of an image is caused. Consequently, a technique is suggested in which a peripheral electrode is provided on the outside of the image display region and ionic impurities are pulled into the peripheral electrode so as to be stayed, thereby preventing the ionic impurities from being aggregated in the image display region (refer to FIG. 4 and the like in JP-A-2008-58497).

More specifically, in the technique described in JP-A-2008-58497, a first peripheral electrode and a second peripheral electrode are provided to surround the periphery of an image display region, different potentials are applied to the first and second peripheral electrodes, and the polarities of the potentials applied to the first and second peripheral electrodes are reversed for each frame, such that due to a lateral electric field between the first and second peripheral electrodes, a little fluctuation of liquid crystals and movement of ionic impurities are performed. In this manner, the ionic impurities are pulled into the first and second peripheral electrodes so as to be stayed therein.

However, in the configuration described in JP-A-2008-58497, consideration for a structure unique to the liquid crystal device is not sufficiently made, so that there is a problem in that aggregation of ionic impurities in the image display region cannot be reliably prevented. More specifically, a seal material is cured before a liquid crystal material is sealed and thus can be cured under appropriate conditions for either light curing or thermal curing. Contrary to this, a sealing material is cured after the liquid crystal material is sealed and thus cannot be cured under appropriate conditions for either light curing or thermal curing from the viewpoint of prevention of deterioration of the liquid crystal material. Therefore, ionic non-reactive components are more likely to be released to the liquid crystal layer from the sealing material than the seal material. However, the peripheral electrodes described in JP-A-2008-58497 cannot reliably pull the ionic impurities generated from the sealing material so as to be stayed therein.

SUMMARY

An advantage of some aspects of the invention is that it provides a liquid crystal device in which, regarding a peripheral electrode extending along a seal material, an ability of the peripheral electrode to trap ionic impurities from a region where display quality is easily affected by ionic impurities is increased, and a projection-type display apparatus including the liquid crystal device.

According to an aspect of the invention, there is provided a liquid crystal device including: an element substrate provided with, on one surface side, an image display region in which a plurality of pixel electrodes are arranged; a counter substrate provided with a common electrode to which a common potential is applied; a seal material which bonds the element substrate and the counter substrate to each other; a sealing material which seals a liquid crystal injection opening through which liquid crystals are injected into a region surrounded by the seal material; a liquid crystal layer which is held in the region surrounded by the seal material between the element substrate and the counter substrate; and a peripheral electrode which is provided in the element substrate so as to extend along the seal material in a peripheral region interposed between the image display region and the seal material, and to which a potential different from the common potential is applied, wherein the peripheral electrode includes a portion which extends with an electrode width Wa and a portion which opposes the sealing material with an electrode width Wb which is greater than the electrode width Wa.

In this aspect of the invention, the peripheral electrode extending along the seal material in the peripheral region is provided in the element substrate, and a potential different from the common potential is applied to the peripheral electrode. Consequently, an electric field in a thickness direction of the liquid crystal layer is generated between the peripheral electrode and the common electrode. Therefore, even though ionic impurities infiltrating during liquid crystal injection, ionic impurities eluted from the seal material, and ionic impurities eluted from the sealing material are present in liquid crystals and the ionic impurities try to be aggregated in an end portion of the image display region due to driving of the liquid crystals, the ionic impurities are pulled into the peripheral electrode in the peripheral region or a portion of the common electrode opposing the peripheral electrode, and the pulled ionic impurities are stayed in the peripheral region while being aggregated therein. Here, according to the aspect of the invention, focusing on the fact that an ability of the peripheral electrode to trap ionic impurities is generally proportionate to the area of the peripheral electrode, the electrode width Wb of the portion of the peripheral electrode opposing the sealing material from which ionic impurities are more likely to be eluted is set to be greater than the electrode width Wa of the portions extending at other positions. Accordingly, the ionic impurities eluted from the sealing material can be efficiently pulled and stayed therein. Therefore, according to the aspect of the invention, it is difficult for the ionic impurities to be aggregated in the image display region, so that degradation of display quality caused by the ionic impurities rarely occurs.

According to the aspect of the invention, the peripheral electrode may employ a configuration in which a first portion which extends along a side where the sealing material is provided in the seal material, a second portion which opposes the first portion with the image display region interposed therebetween, a third portion which is provided between one ends of the first and second portions, and a fourth portion which opposes the third portion with the image display region interposed therebetween are provided and the first portion has the electrode width Wb. In this configuration, since the entirety of the first portion extending along the portion where the sealing material is provided extends with the electrode width Wb which is large, ionic impurities eluted from the sealing material can be efficiently pulled and stayed therein.

According to the aspect of the invention, it is preferable that from the second, third, and fourth portions in the peripheral electrode, the portion extending in a region where the peripheral region has a large width extends with the electrode width Wa, and the portion extending in a region where the peripheral region has a small width extends with an electrode width Wc that is greater than the electrode width Wa. For example, the second portion extends with the electrode width Wc, and the third and fourth portions extend with the electrode width Wa. In this configuration, since the electrode width of the peripheral electrode provided at a point where the interval between the seal material and the image display region is narrow is large, infiltration of ionic impurities eluted from the seal material into the image display region can be effectively prevented.

According to the aspect of the invention, a configuration in which the electrode width We is equal to the electrode width Wb may be employed. In this configuration, since the electrode width of the peripheral electrode provided at a point where the interval between the seal material and the image display region is narrow is large, infiltration of ionic impurities eluted from the seal material into the image display region can be effectively prevented.

The aspect of the invention is effective when being applied to a case where an alignment film is an inorganic alignment film, and a nematic liquid crystal compound with negative dielectric anisotropy is used in the liquid crystal layer. The inorganic alignment film is more likely to adsorb ionic impurities. However, according to the aspect of the invention, even in the case where the alignment film is used, aggregation of ionic impurities in the image display region can be reliably prevented. In addition, in the case where the nematic liquid crystal compound with negative dielectric anisotropy is used in the liquid crystal layer, since liquid crystal molecules rotate about a point in a longitudinal direction, ionic impurities are easily gathered in a specific point and thus deterioration of images easily occurs. However, according to the aspect of the invention, even in the case where the nematic liquid crystal compound with negative dielectric anisotropy is used, aggregation of ionic impurities in the image display region can be reliably prevented.

The liquid crystal device according to the aspect of the invention is used as, for example, a light valve or a direct-view display device of a projection-type display apparatus. In the case where the liquid crystal device according to the aspect of the invention is used in the projection-type display apparatus, the projection-type display apparatus is provided with a light source unit that emits light supplied to the liquid crystal device, and a projection optical system that projects light modulated by the liquid crystal device.

BRIEF DESCRIPTION OF THE DRAWINGS

The invention will be described with reference to the accompanying drawings, wherein like numbers reference like elements.

FIGS. 2A and 2B are diagrams illustrating a liquid crystal panel of the liquid crystal device to which the embodiment of the invention is applied.

FIGS. 6A and 6B are diagrams illustrating a peripheral electrode formed on an element substrate of the liquid crystal device according to the first embodiment of the invention.

DESCRIPTION OF EXEMPLARY EMBODIMENTS

Figure 1:
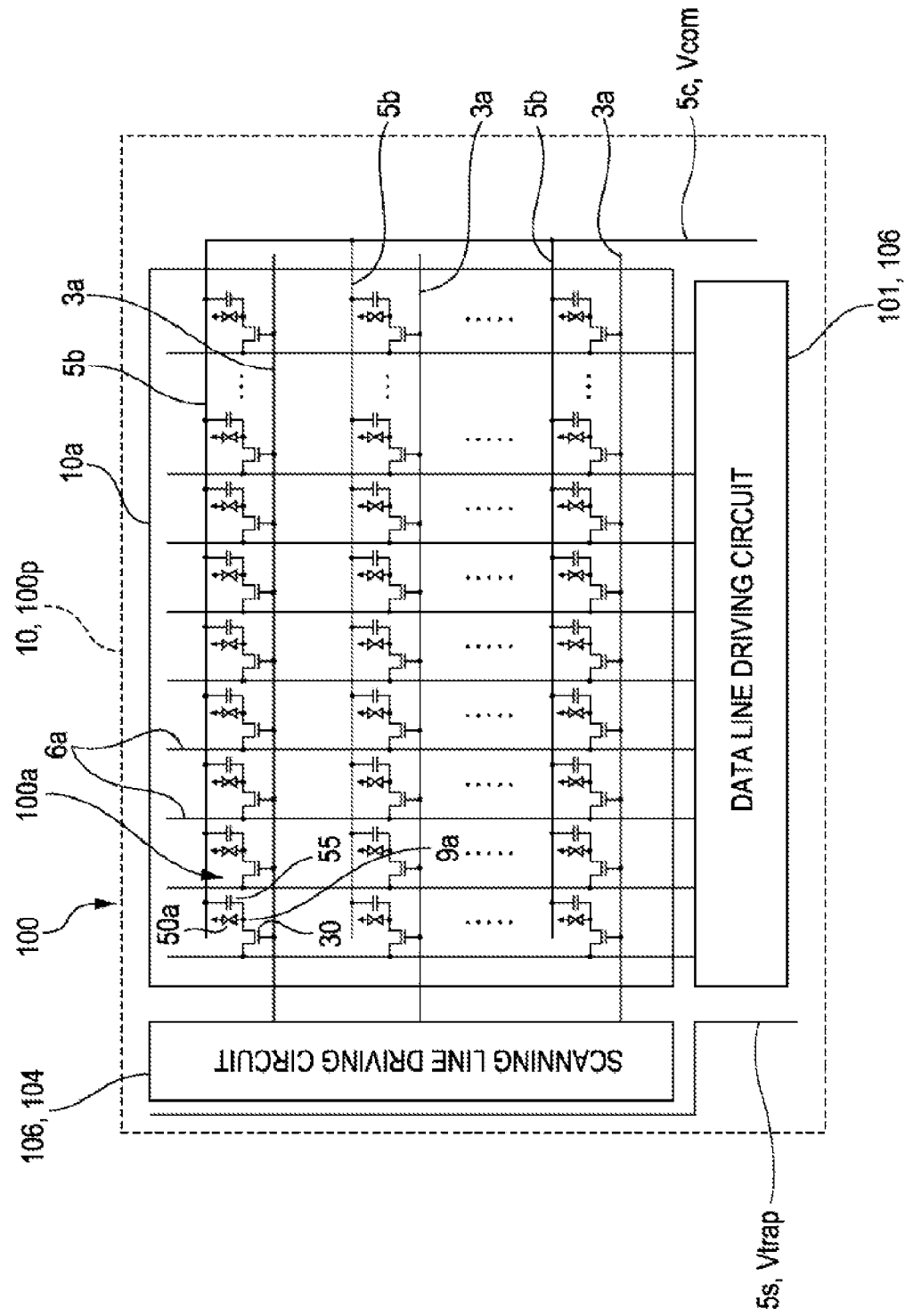
FIG. 1 is a block diagram illustrating an electrical configuration of a liquid crystal device to which an embodiment of the invention is applied.

Exemplary embodiments of the invention will be described with reference to the drawings. In the drawings used for the following description, in order to allow each layer or each member to have a recognizable size, the scale of each layer or each member is changed. In addition, when the direction of current flowing through a field-effect transistor is reversed, the source and the drain are switched. However, in the following description, for convenience, it is described that a side to which a pixel electrode is connected serves as the drain, and a side to which a data line is connected serves as the source. In addition, when layers formed on an element substrate is described, an upper layer side or a surface side means an opposite side (a side where a counter substrate is positioned) to a side where a substrate body of the element substrate is positioned, and a lower layer side means the side (the opposite side to the side where the counter substrate is positioned) where the substrate body of the element substrate is positioned.

First Embodiment

Overall Configuration

FIG. 1 is a block diagram illustrating an electrical configuration of a liquid crystal device to which an embodiment of the invention is applied. In addition, FIG. 1 is a block diagram illustrating only the electrical configuration and does not illustrate shapes of wires and electrodes, extension directions, layouts, and the like.

In FIG. 1, a liquid crystal device 100 has a liquid crystal panel 100p in a TN (Twisted Nematic) mode or a VA (Vertical Alignment) mode, and the liquid crystal panel 100p includes an image display region 10a (image display region) having a plurality of pixels 100a arranged in a matrix form at the center region. In the liquid crystal panel 100p, in an element substrate 10 (see FIGS. 2A and 2B and the like) described later, a plurality of data lines 6a and a plurality of scanning lines 3a extend vertically and horizontally inside the image display region 10a, and pixels 100a are configured at positions corresponding to the intersections. In each of the plurality of pixels 100a, a pixel transistor 30 made of a field-effect transistor and a pixel electrode 9a described later are formed. The source of the pixel transistor 30 is electrically connected to the data line 6a, the gate of the pixel transistor 30 is electrically connected to the scanning line 3a, and the drain of the pixel transistor 30 is electrically connected to the pixel electrode 9a.

In the element substrate 10, on the outer peripheral side than the image display region 10a, a scanning line driving circuit 104, a data line driving circuit 101, and peripheral circuit portion 106 including various wires are provided. The data line driving circuit 101 is electrically connected to each data line 6a and sequentially supplies an image signal supplied from an image processing circuit to the data lines 6a. The scanning line driving circuit 104 is electrically connected to each scanning line 3a and sequentially supplies a scanning signal to the scanning lines 3a.

In each pixel 100a, the pixel electrode 9a opposes a common electrode formed in a counter substrate 20 (see FIGS. 2A and 2B and the like) described later via a liquid crystal layer, thereby constituting a liquid crystal capacitor 50a. In addition, in each pixel 100a, in order to prevent a change in an image signal held in the liquid crystal capacitor 50a, a storage capacitor 55 is added in parallel with the liquid crystal capacitor 50a. In this embodiment, in order to configure the storage capacitor 55, a capacitor line 5b extending in parallel with the scanning lines 3a over the plurality of pixels 100a is formed.

In the liquid crystal device 100, in the formation region and the vicinity of the scanning line driving circuit 104 and the data line driving circuit 101, a common potential line 5c to which a common potential Vcom is applied and a wire 5s which supplies a potential Vtrap for trapping ion impurities that is different from the common potential Vcom are provided. The storage capacitor 55 is electrically connected to the common potential line 5c, and a peripheral electrode described later is electrically connected to the wire 5s.

Configurations of Liquid Crystal Panel 100p and Element Substrate 10

Figure 3A:
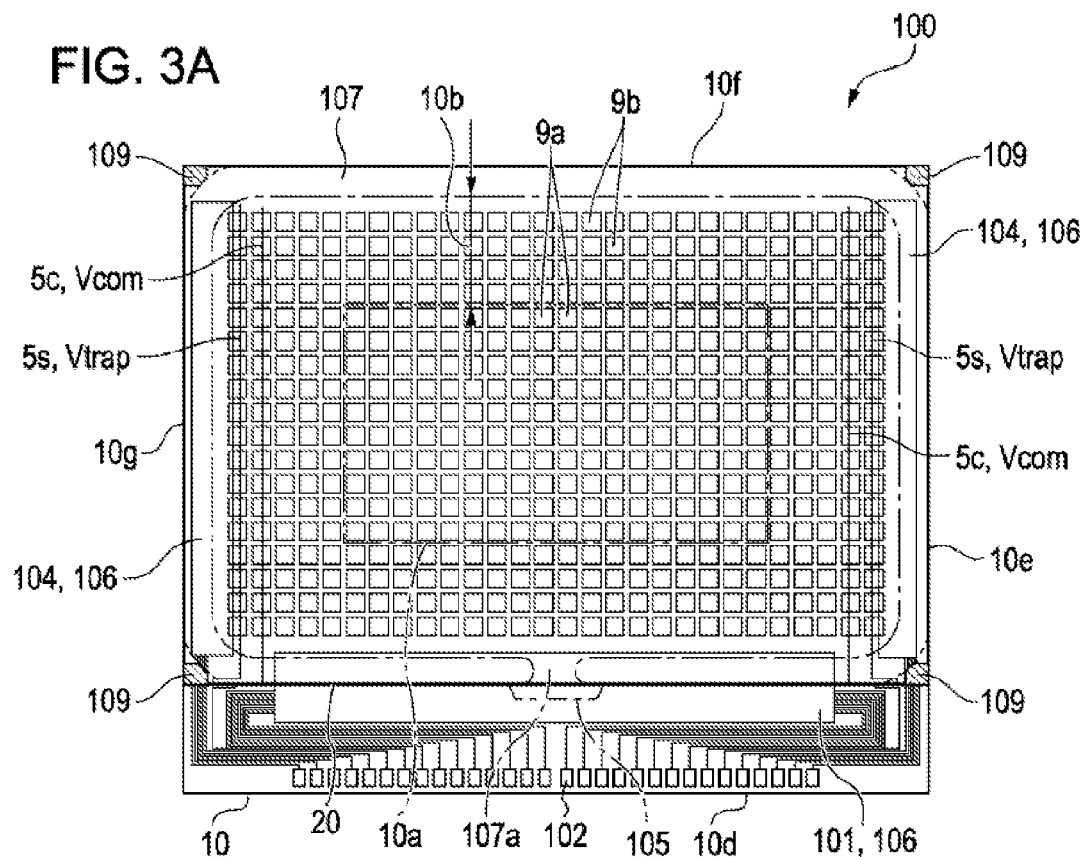
FIGS. 3A and 3B are diagrams illustrating an electrode and the like formed on an element substrate of the liquid crystal device to which the embodiment of the invention is applied.
Figure 3B:
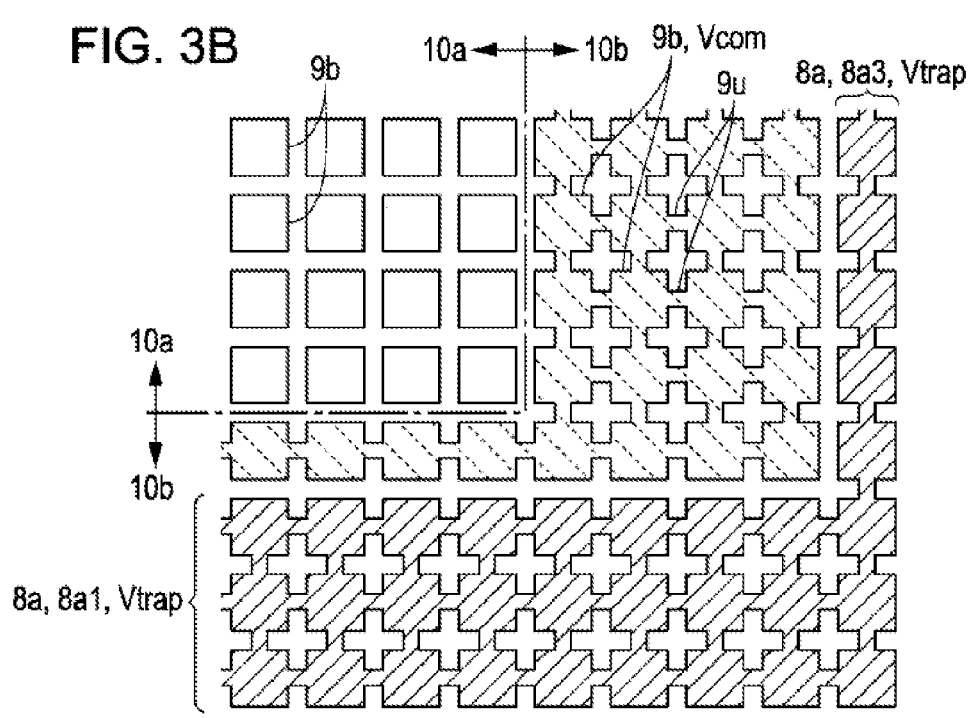

FIGS. 2A and 2B are diagrams illustrating the liquid crystal panel 100p of the liquid crystal device 100 to which the embodiment of the invention is applied, and FIGS. 2A and 2B are respectively a plan view of the liquid crystal panel 100p of the liquid crystal device 100 to which the embodiment of the invention is applied along with each component thereof as viewed from the counter substrate side, and a cross-sectional view thereof taken along the line IIB-IIB. FIGS. 3A and 3B are diagrams illustrating an electrode and the like formed on the element substrate 10 of the liquid crystal device 100 to which the embodiment of the invention is applied, and FIGS. 3A and 3B are respectively a diagram illustrating the layout of the pixel electrodes 9a and dummy pixel electrodes 9b in the entirety of the element substrate 10 and a diagram illustrating the shape of the dummy pixel electrode 9b and the like. In FIG. 3A, illustration of a peripheral electrode 8a is omitted. In addition, in FIGS. 3A and 3B, the number of the pixel electrodes 9a, the dummy pixel electrodes 9b, and the like is reduced for illustration.

As illustrated in FIGS. 2A, 2B, and 3A, in the liquid crystal panel 100p, the element substrate 10 and the counter substrate 20 are bonded to each other by a seal material 107 with a predetermined gap, and the seal material 107 is provided in a frame shape along the outer periphery of the counter substrate 20. The seal material 107 is an adhesive made of a photocurable resin or a thermosetting resin, and having a gap material, such as glass fiber or glass beads, which is blended therein for causing the distance between the two substrates to have a predetermined value.

In this embodiment, the seal material 107 is provided with a broken portion used as a liquid crystal injection opening 107a, and the broken portion is used as an injection opening when a liquid crystal material is depressurized and injected, and is sealed by a sealing material 105 made of a photocurable resin, a thermosetting resin, or the like after the injection of the liquid crystal material. In this embodiment, from among four substrate sides 10d to 10g of the element substrate 10, the liquid crystal injection opening 107a and the sealing material 105 are provided on the side where the substrate side 10d is positioned. In this embodiment, as the seal material 107 and the sealing material 105, an acrylic or epoxy-based photocurable resin is used.

In the liquid crystal panel 100p having this configuration, both the element substrate 10 and the counter substrate 20 are quadrangular, substantially at the center of the liquid crystal panel 100p, the liquid display region 10a described with reference to FIG. 1 is provided as a quadrangular region. Corresponding to the shape, the seal material 107 is provided in a substantially quadrangular shape, and between the inner peripheral edge of the seal material 107 and the outer peripheral edge of the image display region 10a, a substantially quadrangular peripheral region 10b is provided in a frame shape.

From one surface 10s and the other surface 10t of the element substrate 10, on the outside of the image display region 10a in a side (a surface side where the counter substrate 20 is positioned) of the one surface 10s, the data line driving circuit 101 and a plurality of terminals 102 are formed along one side (the substrate side 10d) of the element substrate 10, and the scanning line driving circuits 104 are formed along the other sides (the substrate sides 10e and 10g) adjacent to the one side. Although described later in detail, on the one surface 10s of the element substrate 10, in the image display region 10a, the pixel transistors 30 described with reference to FIG. 1 and the rectangular pixel electrodes 9a which are electrically connected to the pixel transistors 30 are formed in a matrix form, and an alignment film 16 described later is formed on the upper layer side of the pixel electrodes 9a.

On the one surface 10s of the element substrate 10, in the peripheral region 10b, the dummy pixel electrodes 9b formed at the same time as the pixel electrodes 9a are formed. Therefore, the alignment film 16 is formed on the upper layer side of the pixel electrodes 9a and the dummy pixel electrodes 9b. Regarding the dummy pixel electrodes 9b, a configuration in which a potential is applied, or a configuration in a floating state in which no potential is applied is employed. In either case, the dummy pixel electrodes 9b compresses a height position between the image display region 10a and the peripheral region 10b when a surface in the element substrate 10 where the alignment film 16 is formed is planarized by polishing and thus contributes to forming the surface where the alignment film 16 as a flat surface. In addition, in this embodiment, the common potential Vcom is applied to the dummy pixel electrodes 9b via the common potential line 5c, so that an alignment disorder of liquid crystal molecules at an end portion of the image display region 10a on the outer peripheral side can be prevented.

In this embodiment, as illustrated in FIG. 3B, the dummy pixel electrodes 9b have the same shapes and the same sizes as those of the pixel electrodes 9a and are formed at the same pitch as that of the pixel electrodes 9a. Here, from among the plurality of dummy pixel electrodes 9b, the adjacent dummy pixel electrodes 9b are connected via connection portions 9u with smaller widths than those of the dummy pixel electrodes 9b. Therefore, when the common potential Vcom is applied to a part of the dummy pixel electrodes 9b, the common potential Vcom is applied to all the dummy pixel electrodes 9b.

Returning to FIG. 2B, from both surfaces of the counter substrate 20, on one surface opposing the element substrate 10, the common electrode 21 is formed, and an alignment film 26 described later is formed at the upper layer of the common electrode 21. The common electrode 21 is formed over the plurality of pixels 100a as a substantially entire surface or a plurality of band-shaped electrodes of the counter substrate 20. In addition, on one substrate surface in the counter substrate 20 opposing the element substrate 10, a light-shielding layer 108 is formed on the lower layer side of the common electrode 21. In this embodiment, the light-shielding layer 108 is formed in a frame shape extending along the outer peripheral edge of the image display region 10a. Here, the outer peripheral edge of the light-shielding layer 108 is at a position distant from the inner peripheral edge of the seal material 107 with a gap, so that the light-shielding layer 108 and the seal material 107 do not overlap with each other. In addition, in the counter substrate 20, the light-shielding layer 108 may be formed as a black matrix portion in a region interposed between the adjacent pixel electrodes 9a, in an overlapping region, and the like.

In the liquid crystal panel 100p configured as described above, in the element substrate 10, an electrode 109 for inter-substrate conduction for electrical conduction between the element substrate 10 and the counter substrate 20 is formed in a region overlapping with an angular portion of the counter substrate 20 on the outer side than the seal material 107, and the electrode 109 for inter-substrate conduction is electrically connected to the common potential line 5c. In addition, at a position overlapping with the electrode 109 for inter-substrate conduction, an inter-substrate conduction material 109a containing conductive particles such as so-called silver points is disposed, and the common potential line 5c of the element substrate 10 and the common electrode 21 of the counter substrate 20 are electrically connected to each other via the inter-substrate conductive material 109a. Therefore, the common potential Vcom is applied to the common electrode 21 from the side of the element substrate 10.

Here, the seal material 107 is provided along the outer peripheral edge of the counter substrate 20 with substantially the same width. Therefore, the seal material 107 is substantially quadrangular. However, since the seal material 107 is provided to avoid the electrode 109 for inter-substrate conduction in the region overlapping with the angular portion of the counter substrate 20 so as to pass through the inside, the angular portion of the seal material 107 has a substantially arc shape.

Regarding the liquid crystal device 100 having the configuration, when the pixel electrode 9a and the common electrode 21 are formed as transmissive conductive films such as ITO (Indium Tin Oxide) films or IZO (Indium Zinc Oxide) film, a transmissive liquid crystal device can be configured. On the other hand, when one of the pixel electrode 9a and the common electrode 21 is formed as a transmissive conductive film and the other one is formed as a reflective conductive film such as an aluminum film, a reflective liquid crystal device can be configured. In the case where the liquid crystal device 100 is of a reflective type, light incident from one of the element substrate 10 and the counter substrate 20 is modulated while being reflected by the other one and emitted, thereby displaying an image. In the case where the liquid crystal device 100 is of a transmissive type, light incident from one of the element substrate 10 and the counter substrate 20 is modulated while being transmitted by the other one and emitted, thereby displaying an image.

The liquid crystal device 100 may be used as a color display device of an electronic apparatus such as a mobile computer or a portable phone, and in this case, a color filter (not shown) or a protective film may be provided in the counter substrate 20. In addition, in the liquid crystal device 100, depending on the kind of a liquid crystal layer 50 in use or a normally white mode and a normally black mode, a polarizing film, a phase difference film, a polarizing plate, and the like are disposed in predetermined directions with respect to the liquid crystal panel 100p. Moreover, the liquid crystal device 100 may be used as a light valve for RGB in a projection-type display apparatus (liquid crystal projector) described later. In this case, in each of the liquid crystal devices 100 for RGB, light with each color separated via a dichroic mirror for RGB color separation is incident as projection light, so that a color filter is not formed.

In this embodiment, a case where the liquid crystal device 100 is a transmissive liquid crystal device used as a light valve for RGB in a projection-type display apparatus described later and light incident from the counter substrate 20 is transmitted by the element substrate 10 so as to be emitted is mainly described. In addition, in this embodiment, a case where the liquid crystal device 100 has, as the liquid crystal layer 50, the liquid crystal panel 100p in the VA mode which uses a nematic liquid crystal compound with negative dielectric anisotropy (dielectric constant anisotropy) is mainly described.

Specific Configuration of Pixel

Figure 4A:
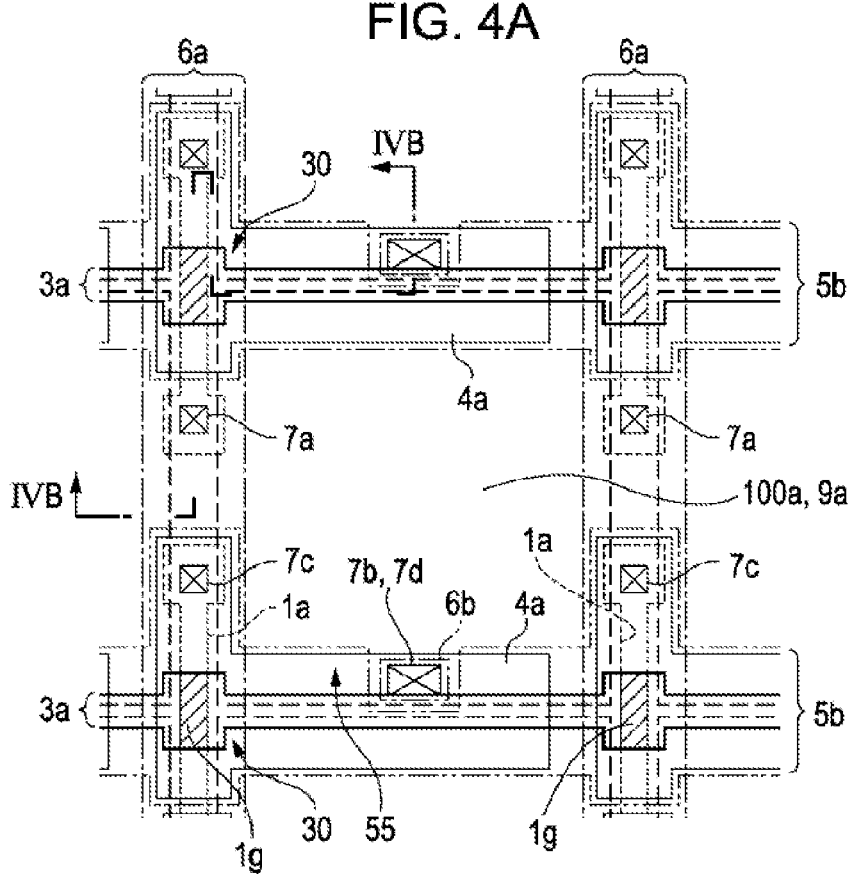
FIGS. 4A and 4B are diagrams illustrating pixels of the liquid crystal device to which the embodiment of the invention is applied.
Figure 4B:
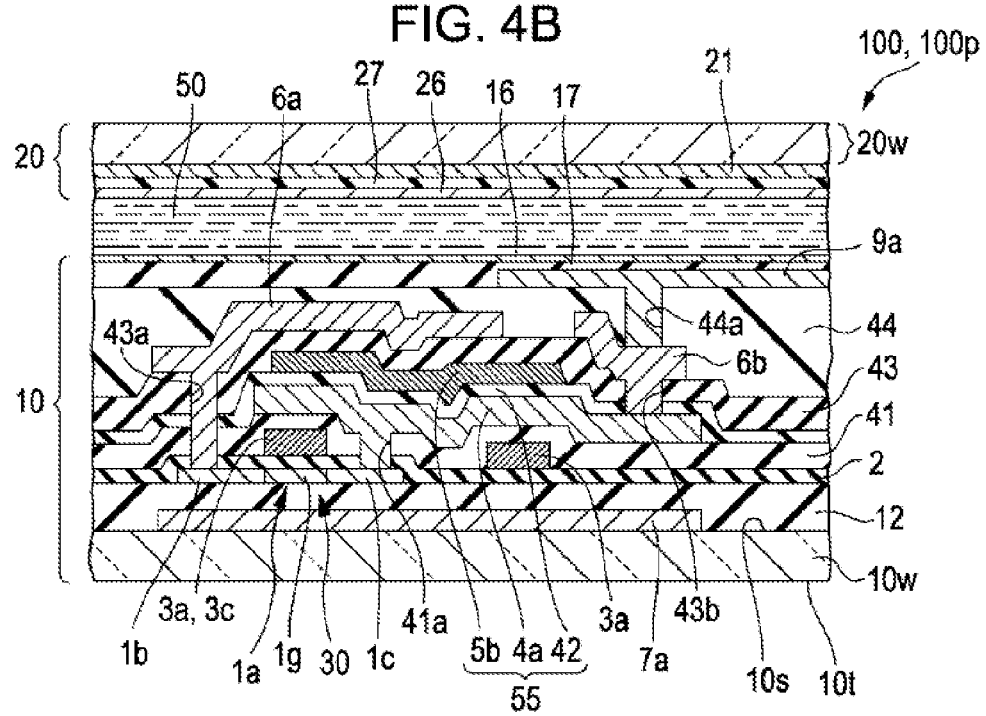

FIGS. 4A and 4B are diagrams illustrating pixels of the liquid crystal device 100 to which the embodiment of the invention is applied, and FIGS. 4A and 4B are respectively a plan view of the pixels which are adjacent in the element substrate 10 using the liquid crystal device 100 to which the embodiment of the invention is applied and a cross-sectional view of the liquid crystal device 100 cut at a position corresponding to the line IVB-IVB of FIG. 4A. In addition, in FIG. 4A, a semiconductor layer is shown by a thin and short dotted line, the scanning line 3a is shown by a thick solid line, the data line 6a and a thin film formed at the same time are shown as dot-dashed lines, the capacitor line 5b is shown by a double-dot-dashed line, the pixel electrode 9a is shown as a thick and long dotted line, and a drain electrode 4a is shown as a thin solid line. In addition, a light-shielding layer 7a is formed in a region where the scanning line 3a and the capacitor line 5b overlap with each other. However, in FIG. 4A, illustration of the light-shielding layer 7a is omitted.

As illustrated in FIG. 4A, on the one surface 10s side of the element substrate 10, the quadrangular pixel electrode 9a is formed at each of the plurality of pixels 100a, and the data line 6a and the scanning line 3a are formed along the vertical and horizontal borders of each of the pixel electrodes 9a. The data lines 6a and the scanning lines 3a extend straightly, and pixel transistors 30 are formed at the intersections of the data lines 6a and the scanning lines 3a. On the element substrate 10, the capacitor line 5b is formed to overlap with the scanning line 3a. In this embodiment, the capacitor line 5b includes a main line part extending straightly so as to overlap with the scanning line 3a, and a sub-line part extending so as to overlap with the data line 6a at the intersection of the data line 6a and the scanning line 3a.

As illustrated in FIGS. 4A and 4B, the element substrate 10 is mainly configured of the pixel electrode 9a formed on the one surface 10s side of a transmissive substrate body 10w such as a quartz substrate or a glass substrate, the pixel transistor 30 for pixel switching, and the alignment film 16. The counter substrate 20 is mainly configured of the common electrode 21 formed on the one surface side of a transmissive substrate body 20w such as a quartz substrate or a glass substrate and the alignment film 26.

In the element substrate 10, the light-shielding layer 7a made of a metal silicide film or a metal film is formed on the one surface 10s side of the substrate body 10w, and a base insulating film 12 is formed on the surface side of the light-shielding layer 7a. In addition, the pixel transistor 30 having a semiconductor layer 1a is formed in each of the plurality of pixels 100a. The semiconductor layer 1a includes a channel region 1g which opposes a gate electrode 3c made of a part of the scanning line 3a via a gate insulating layer 2, a source region 1b, and a drain region 1c each of which includes a low-concentration region and a high-concentration region. The semiconductor layer 1a is configured of, for example, a polycrystalline film formed on the surface of the base insulating film 12, and the gate insulating layer 2 is made of a silicon oxide film or a silicon nitride film formed by a CVD method or the like. In addition, there may be a case where the gate insulating layer 2 has a double-layer structure including a silicon oxide film made by performing thermal oxidation on the semiconductor layer 1a and a silicon oxide film or silicon nitride film formed by the CVD method or the like. A conductive polysilicon film, a metal silicide film, or a metal film is used for the scanning line 3a. In addition, in this embodiment, for the purpose of preventing an occurrence of a malfunction caused by photocurrent that occurs in the pixel transistor 30 when light transmitted by the liquid crystal device 100 is reflected by another member and the reflected light is incident onto the semiconductor layer 1a, the light-shielding layer 7a is provided in a region overlapping with the pixel transistor 30. Here, a structure in which the liquid-shielding layer 7a is formed as the scanning line and the gate electrode 3c and the light-shielding layer 7a are electrically connected to each other via a contact hole may be employed.

A first inter-layer insulating film 41 made of a silicon oxide film or the like is formed on the upper layer side of the scanning line 3a, and the drain electrode 4a is formed on the first inter-layer insulating film 41. The drain electrode 4a is formed in a substantially L shape extending along the scanning line 3a and the data line 6a from the position where the scanning line 3a and the data line 6a intersect as the starting point. The drain electrode 4a is made of a conductive polysilicon slim, a metal silicide film, a metal film, or the like and is electrically connected to the drain region 1c via a contact hole 41a.

A dielectric layer 42 made of a silicon nitride film, a silicon oxide film, or the like is formed on the upper layer side of the drain electrode 4a. The capacitor line 5b is formed on the upper layer side of the dielectric layer 42 so as to oppose the drain electrode 4a via the dielectric layer 42, and the storage capacitor 55 is constituted by the capacitor line 5b, the dielectric layer 42, and the drain electrode 4a. The capacitor line 5b is made of a conductive polysilicon film, a metal silicide film, a metal film, or the like.

A second inter-layer insulating film 43 made of a silicon oxide film or the like is formed on the upper layer side of the capacitor line 5b, and the data line 6a and a relay electrode 6b are formed on the second inter-layer insulating film 43. The data line 6a is electrically connected to the source region 1b via a contact hole 43a. The relay electrode 6b is electrically connected to the drain electrode 4a via a contract hole 43b and is electrically connected to the drain region 1c via the drain electrode 4a. The data line 6a and the relay electrode 6b are made of a conductive polysilicon film, a metal silicide film, a metal film, or the like.

A third inter-layer insulating film 44 made of a silicon oxide film or the like is formed on the upper layer side of the data line 6a and the relay electrode 6b. The third inter-layer insulating film 44 is provided with a contact-hole 44a connected to the relay electrode 6b. The pixel electrode 9a made of a transmissive conductive film such as an ITO film is formed on the third inter-layer insulating film 44, and the pixel electrode 9a is electrically connected to the relay electrode 6b via the contract hole 44a. In this embodiment, the surface of the third inter-layer insulating film 44 is a flat surface.

Here, the dummy pixel electrode 9b (not shown in FIGS. 4A and 4B) described with reference to FIGS. 2B and 3A is formed on the surface of the third inter-layer film 44, and the dummy pixel electrode 9b is made of a transmissive conductive film formed at the same time with the pixel electrode 9a.

The alignment film 16 is formed on the surface of the pixel electrode 9a. The alignment film 16 is made of a resin film such as polyimide or an oblique vapor deposition film such as a silicon oxide film. In this embodiment, the alignment film 16 is an inorganic alignment film (vertical alignment film) made of an oblique vapor deposition film such as $SiO_x$ (x<2), $SiO_2$, $TiO_2$, $MgO$, $Al_2O_3$, $In_2O_3$, $Sb_2O_3$, or $Ta_2O_5$, and a surface insulating film 17 such as a silicon oxide film or a silicon nitride film is formed between the alignment film 16 and the pixel electrode 9a.

The surface of the surface insulating film 17 is formed as a flat surface so as to bury recessed portions formed between the pixel electrodes 9a. Therefore, the alignment film 16 is formed on the flat surface of the surface insulating film 17. This configuration can be realized by polishing the surface of the surface insulating film 17 after forming the surface insulating film 17 on the surface side of the pixel electrode 9a.

As the polishing, chemical mechanical polishing may be used. During the chemical mechanical polishing, a flat polished surface can be obtained at high speed by an action of a chemical component contained in a polishing liquid and a relative movement of an abrasive and the element substrate 10. More specifically, the polishing apparatus performs polishing while rotating a surface plate to which polishing fabric (pad) made of a porous fluorine resin or the like is adhered and a holder that holds the element substrate 10 relative to each other. At this time, for example, an abrasive containing cerium oxide particles having an average particle size of 0.01 to 20 v, an acrylic ester derivative as a dispersant, and water is supplied between the polishing fabric and the element substrate 10. At this time, when a significant height difference between the image display region 10a and the peripheral region 10b is present, even though the polishing process is performed, it is difficult to form the inside of the image display region 10a as a flat surface. However, in this embodiment, as described above with reference to FIGS. 2A to 3B, the dummy pixel electrode 9b is formed in the peripheral region 10b. Therefore, there is no significant height difference between the image display region 10a and the peripheral region 10b at the time point when the surface insulating film 17 is formed. Consequently, the surface of the surface insulating film 17 in the image display region 10a can be formed as the flat surface by performing the polishing process.

In the counter substrate 20, the common electrode 21 is formed on the one surface side of the transmissive substrate body 20w such as a quartz substrate or a glass substrate, and the alignment film 26 is formed so as to cover the common electrode 21. The alignment film 26 is made of, like the alignment film 16, a resin film such as polyimide or an oblique vapor deposition film such as a silicon oxide film. In this embodiment, the alignment film 26 is an inorganic alignment film (vertical alignment film) made of an oblique vapor deposition film such as $SiO_x$ (x<2), $SiO_2$, $TiO_2$, $MgO$, $Al_2O_3$, $In_2O_3$, $Sb_2O_3$, or $Ta_2O_5$, and a protective film 27 such as a silicon oxide film or a silicon nitride film is formed between the alignment film 26 and the common electrode 21. The surface of the protective film 27 is formed as a flat surface, and the alignment film 26 is formed on the flat surface. The alignment films 16 and 26 vertically align the nematic liquid crystal compounds with negative dielectric anisotropy used in the liquid crystal layer 50, so that the liquid crystal panel 100p operates as a VA mode in a normally black mode.

Configuration of Peripheral Region 10b

Figure 5:
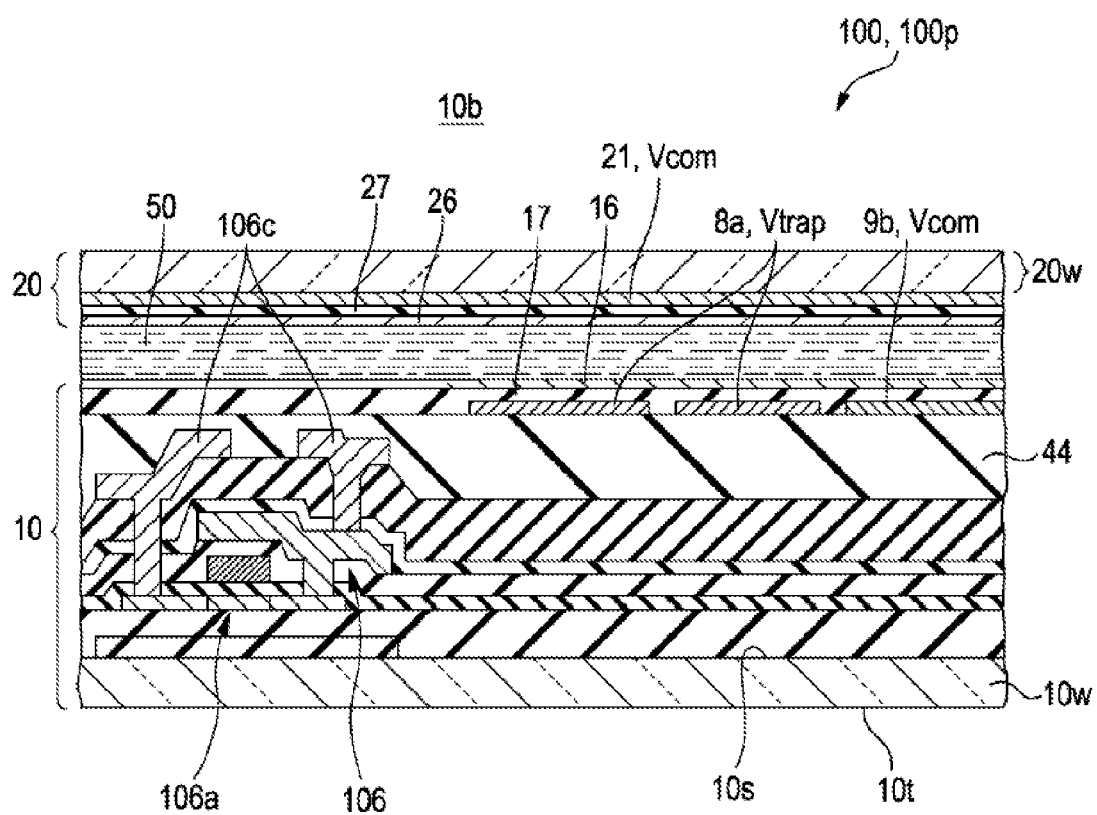
FIG. 5 is a diagram illustrating a cross-sectional configuration of a peripheral region of a liquid crystal device according to a first embodiment of the invention.

FIG. 5 is a diagram illustrating a cross-sectional configuration of the peripheral region 10b of the liquid crystal device 100 according to the first embodiment of the invention. As illustrated in FIG. 5, in the liquid crystal device 100, the peripheral circuit portion 106 including the data line driving circuit 101, the scanning line driving circuit 104, and the like described with reference to FIGS. 1 to 2B is provided with a complementary transistor circuit including an n-channel or p-channel driving transistor 106a, and the like. In addition, the peripheral circuit portion 106 is also provided with various wires 106c and the like. Here, since the driving transistor 106a is formed using a part of the manufacturing process of the pixel transistor 30, a region where the data line driving circuit 101 and the scanning line driving circuit 104 are formed in the element substrate 10 has substantially the same cross-sectional configuration as the cross-sectional configuration illustrated in FIG. 3B.

In this embodiment, in the peripheral region 10b, the dummy pixel electrode 9b is formed on the surface of the third inter-layer insulating film 44 that covers the peripheral circuit portion 106, and the dummy pixel electrode 9b is electrically connected to the common potential line 5c illustrated in FIGS. 1, 2A, and 3A using an empty region of the peripheral circuit portion 106 in the peripheral region 10b. A contact hole (not shown) provided in the third inter-layer insulating film 44 or the like is used for the electrical connection between the dummy pixel electrode 9b and the common potential line 5c.

Detailed Configuration of Peripheral Electrode 8a

FIGS. 6A and 6B are diagrams illustrating the peripheral electrode 8a formed on the element substrate 10 of the liquid crystal device 100 according to the first embodiment of the invention, and FIGS. 6A and 6B are respectively a diagram illustrating the layout of the overall peripheral electrode 8a and an enlarged view illustrating the peripheral electrode 8a. In addition, in FIGS. 6A and 6B, the number of the pixel electrodes 9a, the dummy pixel electrodes 9b, and the like is reduced for illustration.

As illustrated in FIGS. 5 to 6B, in the element substrate 10 of the liquid crystal device 100 of this embodiment, the peripheral electrode 8a for trapping ionic impurities is formed on the outer peripheral side than the dummy pixel electrodes 9b in the peripheral region 10b interposed between the image display region 10a and the seal material 107. In this embodiment, the peripheral electrode 8a is made of a conductive metal oxide film such as ITO or IZO, a conductive polysilicon film, a metal silicide film, a metal film, or the like. The peripheral electrode 8a is electrically connected to the wires 5s illustrated in FIGS. 1, 2A, and 3A using empty regions of the peripheral circuit portion 106 and the dummy pixel electrode 9b. A contact hole (not shown) provided in the third inter-layer insulating film 44 or the like is used for the electrical connection between the peripheral electrode 8a and the wire 5s.

In this embodiment, the peripheral electrode 8a is made of a conductive film formed at the same time as the dummy pixel electrodes 9b and the pixel electrodes 9a. Therefore, the peripheral electrode 8a is formed on the surface of the third inter-layer insulating film 43 like the dummy pixel electrodes 9b and the pixel electrodes 9a, and the surface insulating film 17 and the alignment film 16 are formed on the upper layer side of the peripheral electrode 8a.

In addition, in this embodiment, the peripheral electrode 8a is formed in the same shape as that of the dummy pixel electrode 9b. More specifically, the peripheral electrode 8a has, like the dummy pixel electrode 9b, a plurality of rectangular portions 8aw and connection portions 8au that connect the rectangular portions 8aw with a smaller width than that of the rectangular portion 8aw. Therefore, the peripheral electrode 8a reduces, like the dummy pixel electrode 9b, a height difference between the image display region 10a and the peripheral region 10b at the time point when the surface insulating film 17 is formed, thereby contributing to forming the surface of the surface insulating film 17 in the image display region 10a as a flat surface.

In this embodiment, the peripheral electrode 8a is formed to extend along the seal material 107 in the peripheral region 10b and is formed in a rectangular frame shape surrounding the image display region 10a over the entire periphery. Therefore, the peripheral electrode 8a includes a first portion 8a1 extending along a portion of the seal material 107 which is provided with the sealing material 105 (liquid crystal injection opening 107a), a second portion 8a2 which opposes the first portion 8a1 with the image display region 10a interposed therebetween, a third portion 8a3 provided between one ends of the first and second portions 8a1 and 8a2, and a fourth portion 8a4 which opposes the third portion 8a3 with the image display region 10a interposed therebetween.

In addition, in this embodiment, the peripheral electrode 8a includes a portion extending with an electrode width Wa and a portion opposing the sealing material 105 with an electrode width Wb which is greater than the electrode width Wa. In order to realize this configuration, in this embodiment, from among the four portions of the peripheral electrode 8a, the second, third, and fourth portions 8a2, 8a3, and 8a4 excluding the portion opposing the sealing material 105 extend with the electrode width Wa, and the first portion 8a1 extending along the portion of the seal material 107 provided with the sealing material 105 (liquid crystal injection opening 107a) extends entirely with the electrode width Wb which is greater than the electrode width Wa. In this embodiment, the electrode width Wb is 200 to 300 μm, and the electrode width Wa is 100 to 150 μm.

In the liquid crystal device 100 configured as described above, the common potential Vcom applied to the common electrode 21 and the dummy pixel electrode 9b is constant at 0V, and the polarity of the signal applied to the pixel electrode 9a is reversed. In addition, the polarity of the potential applied to the peripheral electrode 8a is reversed. For example, the polarity of the potential Vtrap applied to the peripheral electrode 8a is reversed at the same timing as the timing at which the polarity of the signal applied to the pixel electrode 9a is reversed. In addition, a configuration in which the polarity of the potential Vtrap applied to the peripheral electrode 8a is reversed at a frequency higher than that of the timing at which the polarity of the signal applied to the pixel electrode 9a is reversed may be employed. In addition, the potential Vtrap applied to the peripheral electrode 8a may be a constant potential. When any driving method is employed, the potential Vtrap applied to the peripheral electrode 8a is always different from the common potential Vcom (0V) applied to the common electrode 21 and the dummy pixel electrode 9b. Therefore, even though ionic impurities infiltrated during liquid crystal injection when the liquid crystal device 100 is manufactured, ionic impurities eluted from the seal material 107, and ionic impurities eluted from the sealing material 105 are present in the liquid crystal layer 50, when the potential Vtrap is applied to the peripheral electrode 8a, an electric field is generated in the thickness direction of the liquid crystal layer 50 between the peripheral electrode 8a and the common electrode 21. Therefore, even though ionic impurities infiltrated during liquid crystal injection or ionic impurities eluted from the sealing material 107 are present in the liquid crystal layer 50, the ionic impurities are efficiently pulled into the peripheral electrode 8a and a portion of the common electrode 21 opposing the peripheral electrode 8a so as to be stayed therein. Therefore, the ionic impurities are not aggregated in the image display region 10a.

Therefore, after the liquid crystal device 100 is manufactured, when the potential Vtrap for trapping ionic impurities is applied to the peripheral electrode 8a and the common potential Vcom is applied to the common electrode 21 during inspection of the liquid crystal device 100, the ionic impurities are pulled into the side where the peripheral electrode 8a is positioned and can be stayed therein. In addition, when the liquid crystal device 100 performs a display operation, even though the posture of liquid crystal molecules used in the liquid crystal layer 50 is switched and thus ionic impurities in the liquid crystal layer 50 are concentrated in the angular portions of the image display region 10a due to a little fluctuation of the liquid crystal molecules caused by the switched posture, the ionic impurities are pulled into the side where the peripheral electrode 8a is positioned and are stayed while being aggregated therein. In particular, when an unbalance in a DC component occurs when the liquid crystal device 100 is driven to be reversed, the ionic impurities in the liquid crystal layer 50 are more likely to be concentrated in the angular portions of the image display region 10a. However, according to this embodiment, the ionic impurities are pulled into the side where the peripheral electrode 8a is positioned and are stayed while being aggregated therein. Therefore, since the ionic impurities are not aggregated in the image display region 10a, occurrence of degradation in quality of an image caused by the ionic impurities can be prevented.

Advantages of This Embodiment

As described above, in the liquid crystal device 100 of this embodiment, since the peripheral electrode 8a to which the potential Vtrap which is different from the common potential Vcom is provided in the peripheral region 10b of the element substrate 10, the ionic impurities are not aggregated in the image display region 10a, and thus degradation of the quality caused by the ionic impurities can be prevented.

Here, in the liquid crystal device 100, the seal material 107 is cured before the liquid crystal material is sealed and thus can be cured under appropriate conditions for either light curing or thermal curing. Contrary to this, the sealing material 105 is cured after the liquid crystal material is sealed and thus cannot be cured under appropriate conditions for either light curing or thermal curing from the viewpoint of prevention of deterioration of the liquid crystal material. Therefore, ionic non-reactive components are more likely to be released from the sealing material 105 than the seal material 107. However, in this embodiment, focusing on the fact that an ability of the peripheral electrode 8a to trap ionic impurities is generally proportionate to the area of the peripheral electrode 8a, the electrode width Wb of the portion of the peripheral electrode 8a opposing the sealing material 105 is set to be greater than the electrode width Wa of the other portions. More specifically, the electrode width Wb of the first portion 8a1 and electrode width Wa of the second, third, and fourth portions 8a2, 8a3, and 8a4 have the following relationship of the electrode width Wa<the electrode width Wb. Therefore, according to this embodiment, ionic impurities eluted from the sealing material 105 can be efficiently pulled and stayed therein. Moreover, in this embodiment, the first portion 8a1 extends entirely with the electrode width Wb and thus can efficiently pull the ionic impurities eluted from the sealing material 105 over a wide range so as to be stayed therein. Therefore, according to this embodiment, it is difficult for the ionic impurities to be aggregated in the image display region 10a, so that degradation of display quality caused by the ionic impurities rarely occurs.

Particularly in the case of the liquid crystal device 100 in the VA mode, due to a flow when liquid crystal molecules are switched between a vertical posture and a horizontal prone posture, ionic impurities in angular regions at opposite angles corresponding to a pretilt orientation are more likely to be maldistributed. However, in this embodiment, ionic impurities can be effectively trapped by the peripheral electrode 8a. In addition, when inorganic alignment films are used as the alignment films 16 and 26, the inorganic alignment films are more likely to adsorb ionic impurities. However, in this embodiment, ionic impurities can be effectively trapped by the peripheral electrode 8a. Therefore, even when the inorganic alignment film is used in the liquid crystal device 100 in the VA mode, aggregation of ionic impurities in the image display region 10a can be reliably prevented.

In addition, in this embodiment, since the peripheral electrode 8a has the same configuration as that of the dummy pixel electrode 9b, at the time point when the surface insulating film 17 is formed, a height difference between the image display region 10a and the peripheral region 10b can be reduced. Consequently, the peripheral electrode 8a contributes to forming the surface of the surface insulating film 17 in the image display region 10a as a flat surface, like the dummy pixel electrode 9b. Therefore, according this embodiment, since the alignment film 16 can be formed on the flat surface, there is an advantage in that the alignment film 16 can be formed under appropriate conditions.

Second Embodiment

Figure 7:
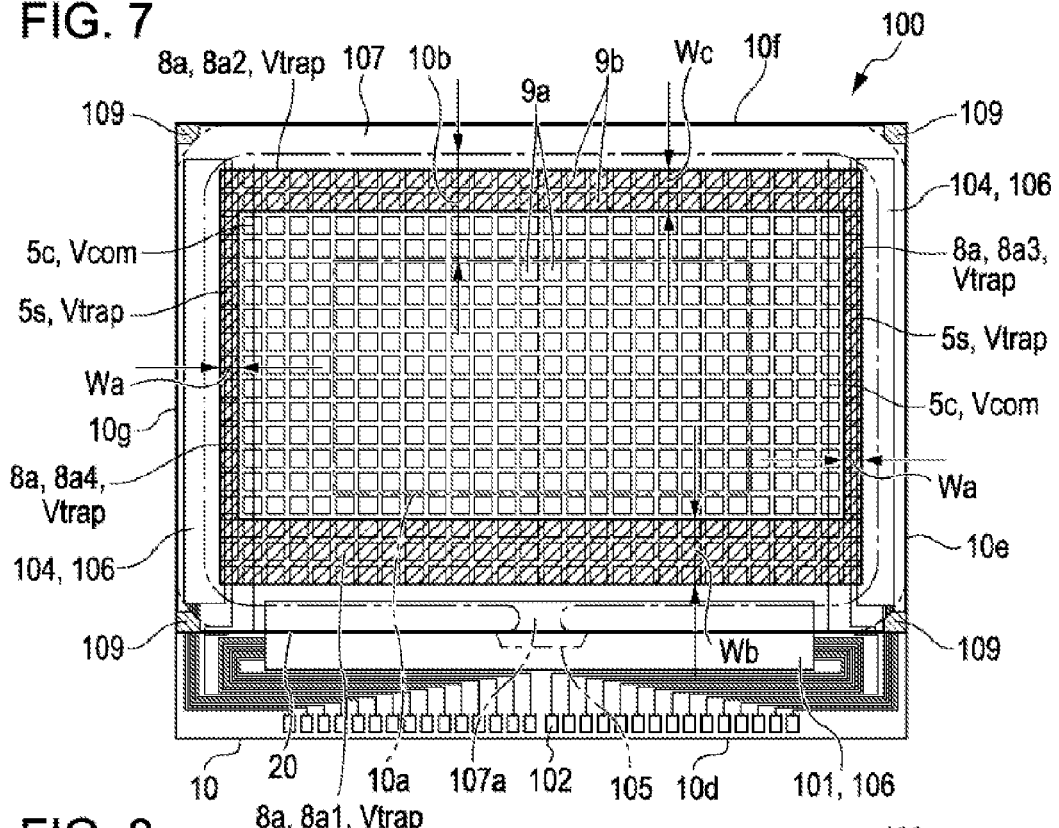
FIG. 7 is a diagram illustrating a peripheral electrode formed on an element substrate of a liquid crystal device according to a second embodiment of the invention.

FIG. 7 is a diagram illustrating the peripheral electrode 8a formed on the element substrate 10 of the liquid crystal device 100 according to a second embodiment of the invention. In addition, in FIG. 7, the number of the pixel electrodes 9a, the dummy pixel electrodes 9b, and the like is reduced for illustration. Since the basic configuration of this embodiment is the same as that of the first embodiment, like elements that are common are denoted by like reference numerals, and description thereof will be omitted.

In the first embodiment, all the second, third, and fourth portions 8a2, 8a3, and 8a4 have the electrode width Wa. However, in this embodiment, as illustrated in FIG. 7, a configuration is employed in which, from among the second, third, and fourth portions 8a2, 8a3, and 8a4, the portions that extend in a region where the peripheral region 10b has a large width extend with the electrode width Wa, and the portions that extend in a region where the peripheral region 10b has a small width extend with an electrode width Wc which is greater than the electrode width Wa.

More specifically, in the peripheral region 10b, the width of the portion extending along the substrate side 10d of the element substrate 10 and the width of the portion extending along the substrate side 10f are smaller than the width of the portion extending along the substrate side 10e and the width of the portion extending along the substrate side 10g. For example, in the peripheral region 10b, the width of the portion extending along the substrate side 10d of the element substrate 10 and the width of the portion extending along the substrate side 10f are about 1 mm, whereas the width of the portion extending the substrate side 10e and the width of the portion extending the substrate side 10g are about 2 mm. Therefore, in this embodiment, a configuration is employed in which, from among the second, third, and fourth portions 8a2, 8a3, and 8a4, the third and fourth portions 8a3 and 8a4 extending in the region where the peripheral region 10b has a large width extend with the electrode width Wa and the second portion 8a2 extending in the region where the peripheral region 10b has a small width extends with the electrode width Wc which is greater than the electrode width Wa. In addition, the first portion 8a1 extending along the portion provided with the sealing material 105 (the liquid crystal injection opening 107a) in the seal material 107 extends entirely with the electrode width Wb which is greater than the electrode widths Wa and Wc.

Therefore, in this embodiment, the electrode width Wa of the third and fourth portions 8a3 and 8a4, the electrode width Wb of the first portion 8a1, and the electrode width Wc of the second portion 8a2 have the following relationship of the electrode width Wa<the electrode width Wc<the electrode width Wb.

Even in the liquid crystal device 100 configured as described above, as in the first embodiment, the peripheral electrode 8a to which the potential Vtrap that is different from the common potential Vcom is applied is provided in the peripheral region 10b of the element substrate 10. In addition, in the peripheral electrode 8a, the electrode width Wb of the portion opposing the sealing material 105 is set to be greater than the electrode widths Wa and Wc of the other portions. Therefore, according to this embodiment, the same effect as that of the first embodiment, such as efficiently pulling impurities eluted from the sealing material 105 so as to be stayed therein, can be exhibited.

Moreover, in this embodiment, a configuration is employed in which, from among the second, third, and fourth portions 8a2, 8a3, and 8a4, the third and fourth portions 8a3 and 8a4 extending in the region where the peripheral region 10b has a large width extend with the electrode width Wa and the second portion 8a2 extending in the region where the peripheral region 10b has a small width extends with the electrode width Wc which is greater than the electrode width Wa. Therefore, since the electrode width of the peripheral electrode 8a provided at a point where the interval between the seal material 107 and the image display region 10a is narrow is large, infiltration of ionic impurities eluted from the seal material 107 into the image display region 10a can be effectively prevented.

Third Embodiment

Figure 8:
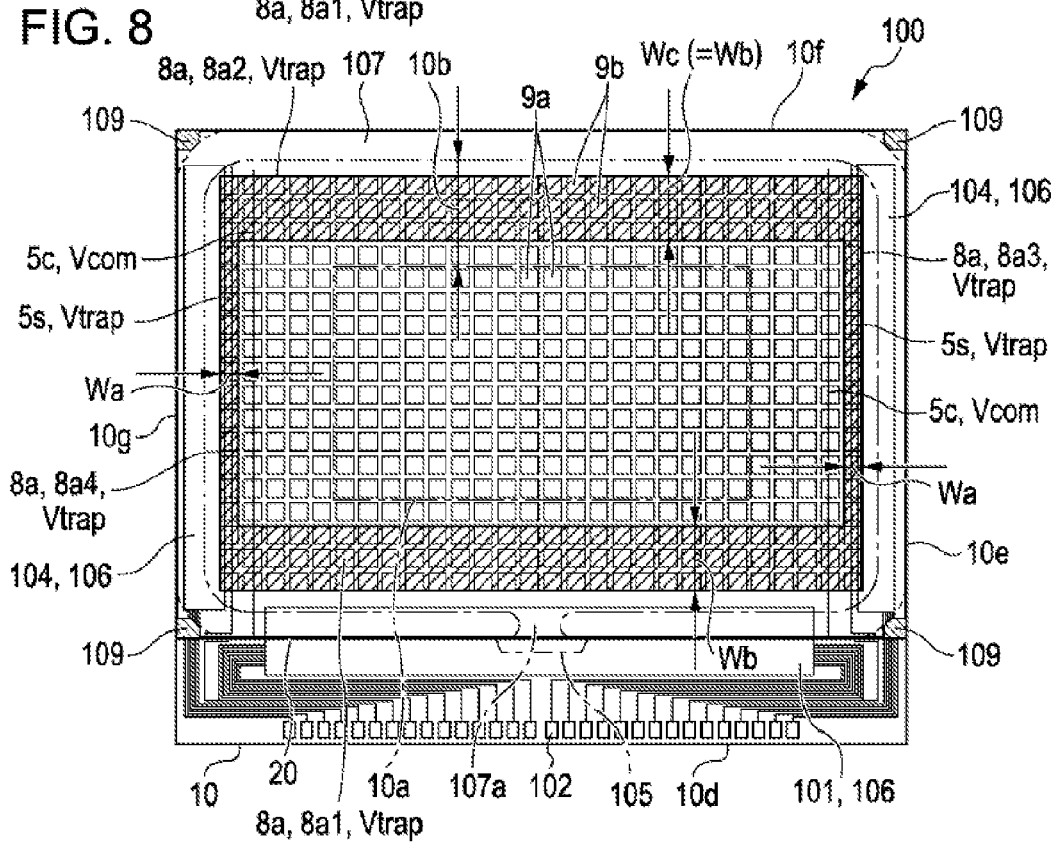
FIG. 8 is a diagram illustrating a peripheral electrode formed on an element substrate of a liquid crystal device according to a third embodiment of the invention.

FIG. 8 is a diagram illustrating the peripheral electrode 8a formed on the element substrate 10 of the liquid crystal device 100 according to a third embodiment of the invention. In addition, in FIG. 8, the number of the pixel electrodes 9a, the dummy pixel electrodes 9b, and the like is reduced for illustration. Since the basic configuration of this embodiment is the same as that of the first embodiment, like elements that are common are denoted by like reference numerals, and description thereof will be omitted.

In the second embodiment, the electrode width Wa of the third and fourth portions 8a3 and 8a4, the electrode width Wb of the first portion 8a1, and the electrode width Wc of the second portion 8a2 have the following relationship of the electrode width Wa<the electrode width Wc<the electrode width Wb. However, in this embodiment, as illustrated in FIG. 8, the electrode width Wb of the first portion 8a1 and the electrode width Wc of the second portion 8a2 are equal to each other. That is, the electrode width Wa of the third and fourth portions 8a3 and 8a4, the electrode width Wb of the first portion 8a1, and the electrode width Wc of the second portion 8a2 have the following relationship of the electrode width Wa<the electrode width Wc=the electrode width Wb. Even in this configuration, substantially the same effect as that of the second embodiment is exhibited.

Fourth Embodiment

Figure 9:
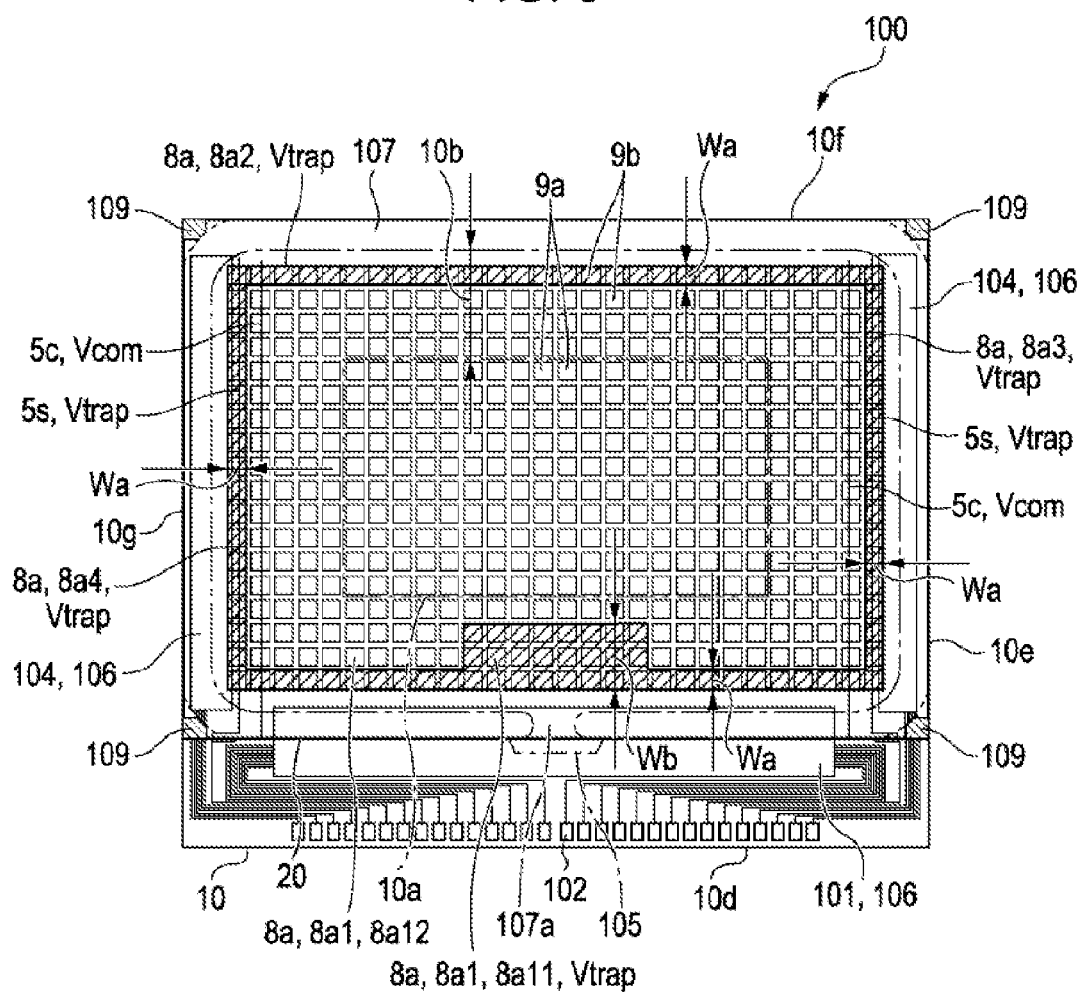
FIG. 9 is a diagram illustrating a peripheral electrode formed on an element substrate of a liquid crystal device according to a fourth embodiment of the invention.

FIG. 9 is a diagram illustrating the peripheral electrode 8a formed on the element substrate 10 of the liquid crystal device 100 according to a fourth embodiment of the invention. In addition, in FIG. 9, the number of the pixel electrodes 9a, the dummy pixel electrodes 9b, and the like is reduced for illustration. Since the basic configuration of this embodiment is the same as that of the first embodiment, like elements that are common are denoted by like reference numerals, and description thereof will be omitted.

In the first embodiment, in the peripheral electrode 8a, when the portion extending with the electrode width Wa and the portion opposing the sealing material 105 with the electrode width Wb which is greater than the electrode width Wa are provided, the entirety of the first portion 8a1 is set to have the electrode width Wb. However, as illustrated in FIG. 9, in the first portion 8a1, a portion 8a11 opposing the sealing material 105 with the electrode width Wb and a portion 8a12 extending with the electrode width Wa may be provided.

Fifth Embodiment

Figure 10:
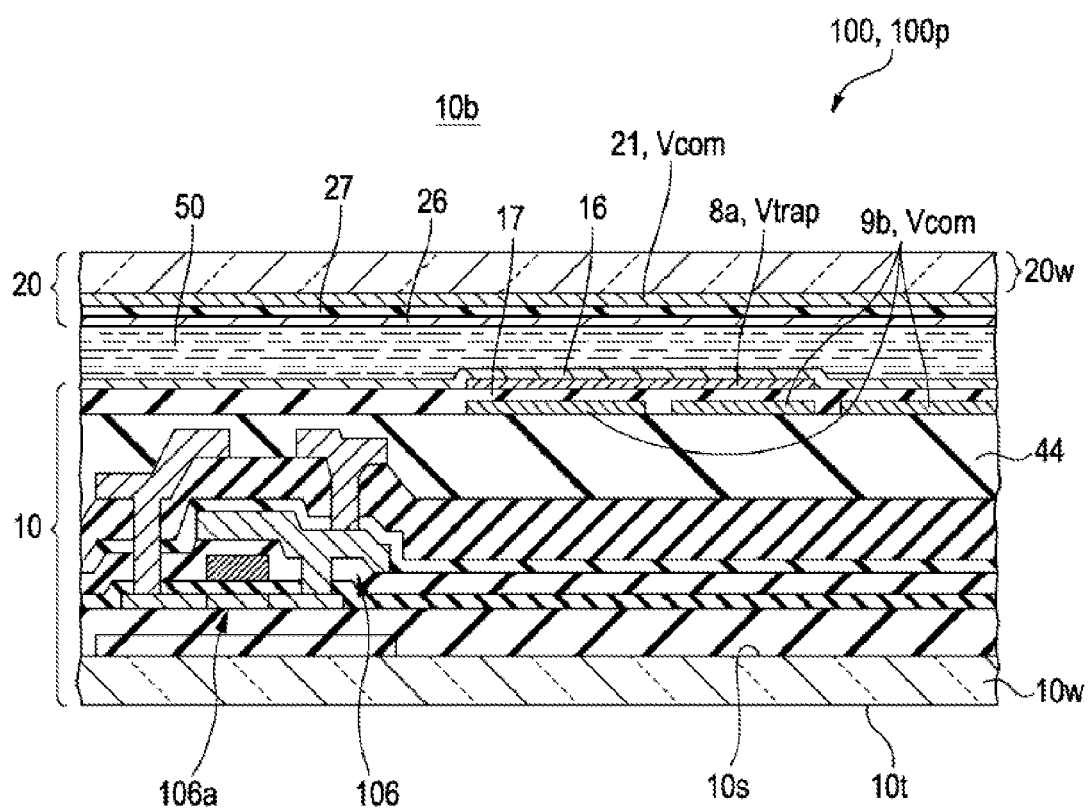
FIG. 10 is a diagram illustrating a cross-sectional configuration of a peripheral region of a liquid crystal device according to a fifth embodiment of the invention.

FIG. 10 is a diagram illustrating the cross-sectional configuration of the peripheral region 10b of the liquid crystal device 100 according to a fifth embodiment of the invention. In addition, since the basic configuration of this embodiment is the same as that of the first embodiment, like elements that are common are denoted by like reference numerals, and description thereof will be omitted.

In the first to fourth embodiments, the peripheral electrode 8a is configured by a conductive film which is formed at the same time as the dummy pixel electrode 9b. However, as illustrated in FIG. 10, the peripheral electrode 8a may be configured by a conductive film which is formed in a different process from that of the dummy pixel electrode 9b. For example, on the surface of the surface insulating film 17, the peripheral electrode 8a may be formed by a conductive film formed in a region overlapping with the dummy pixel electrode 9b. Even in this case, the alignment film 16 is formed on the surface side of the peripheral electrode 8a.

In addition, when the peripheral electrode 8a is configured by a conductive film formed in a different process from that of the dummy pixel electrode 9b, the peripheral electrode 8a may be formed by a conductive film formed in a region which does not overlap with the dummy pixel electrode 9b on the surface of the surface insulating film 17. In addition, when the peripheral electrode 8a is configured by a conductive film formed in a different process from that of the dummy pixel electrode 9b, like the dummy pixel electrode 9b, the peripheral electrode 8a may be formed by a conductive film formed on the surface of the third inter-layer insulating film 44. Moreover, the peripheral electrode 8a may be formed in the liquid crystal device 100 in which the dummy pixel electrode 9b is not provided.

Other Embodiments

In the embodiments described above, the peripheral electrode 8a is configured so that the entire periphery is connected. However, the peripheral electrode 8a may be partially broken as long as the potential Vtrap for trapping ionic impurities can be applied thereto. In addition, in the embodiments described above, the peripheral electrode 8a is formed as a single row. However, the peripheral electrode 8a may be formed as a plurality of rows, and in this case, the electrode width of each part may be set to the sum of the widths of the peripheral electrodes 8a of each portion so as to set the conditions related to the invention. In addition, in the case where the peripheral electrode 8a is formed as the plurality of rows, different potentials Vtrap for trapping ionic impurities may be applied to the plurality of peripheral electrodes 8a.

In the embodiments described above, the invention is applied to the transmissive liquid crystal device 100. However, the invention may also be applied to a reflective liquid crystal device 100.

Example of Application to Electronic Apparatus

Figure 11A:
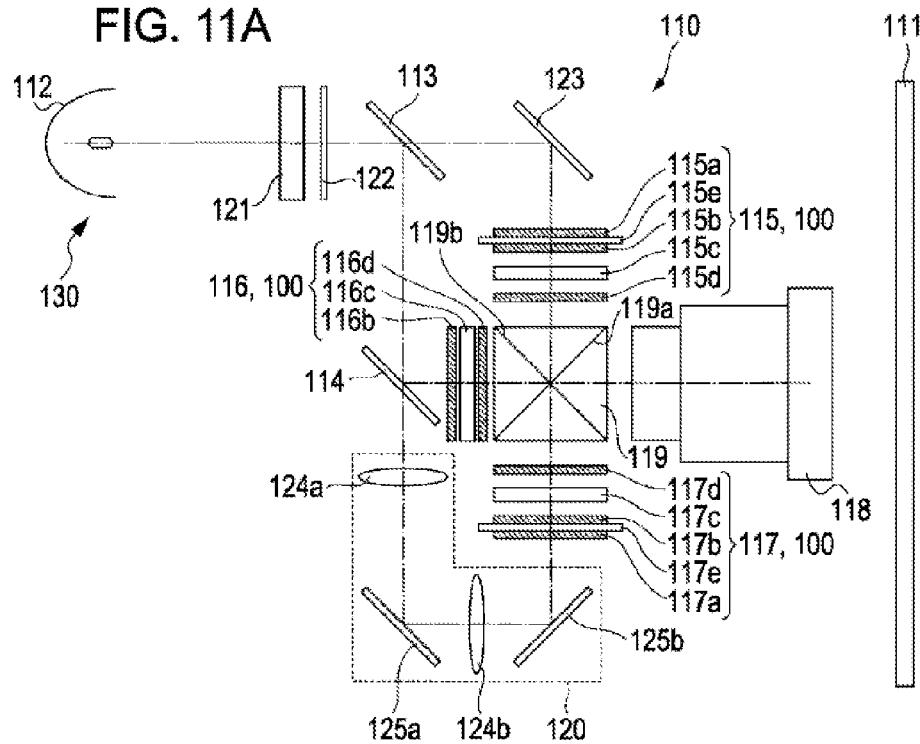
FIGS. 11A and 11B are diagrams illustrating schematic configurations of projection-type display apparatuses using the liquid crystal device to which the embodiment of the invention is applied.
Figure 11B:
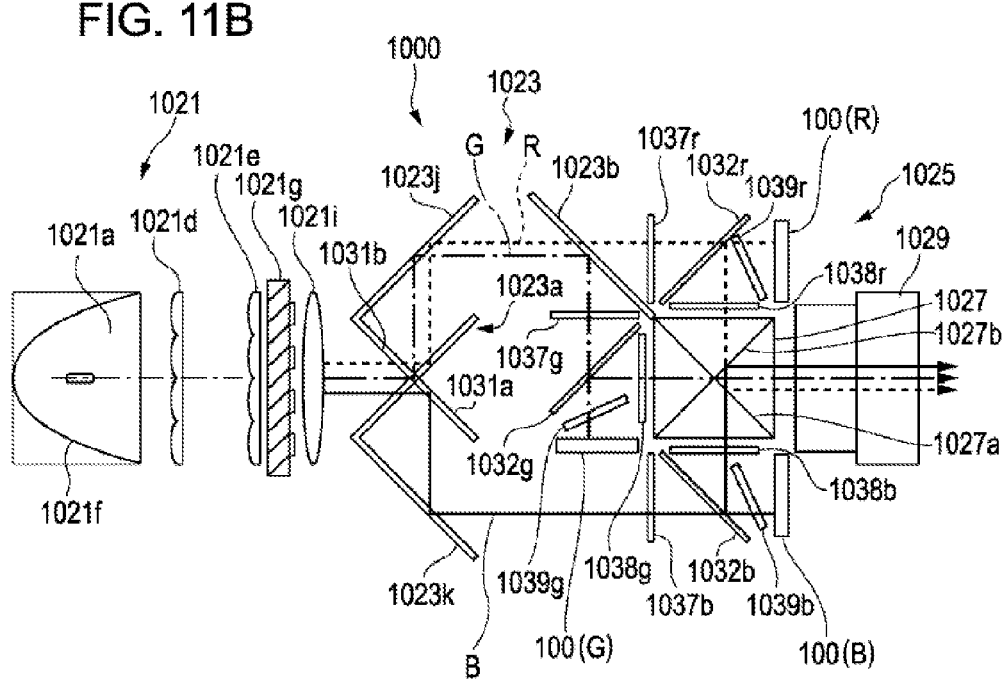

An electronic apparatus to which the liquid crystal device 100 according to the embodiment described above is applied will be described. FIGS. 11A and 11B are diagrams illustrating schematic configurations of projection-type display apparatuses using the liquid crystal device 100 to which the embodiment of the invention is applied, and FIGS. 11A and 11B are respectively a diagram illustrating the projection-type display apparatus using the transmissive liquid crystal device 100 and a diagram illustrating the projection-type display apparatus using the reflective liquid crystal device 100.

First Example of Projection-Type Display Apparatus

The projection-type display apparatus 110 illustrated in FIG. 11A is a so-called projection-type display apparatus which emits light onto a screen 111 provided on an observer side so as to observe the light reflected by the screen 111. The projection-type display apparatus 110 includes a light source unit 130 having a light source 112, dichroic mirrors 113 and 114, liquid crystal light valves 115 to 117 (the liquid crystal device 100), a projection optical system 118, a cross dichroic prism 119, and a relay system 120.

The light source 112 is configured as an ultra-high pressure mercury lamp which supplies light including red light, green light, and blue light. The dichroic mirror 113 is configured to transmit the red light from the light source 112 and reflect the green light and the blue light. In addition, the dichroic mirror 114 is configured to transmit the blue light from the green light and the blue light reflected by the dichroic mirror 113 and reflect the green light. As described above, the dichroic mirrors 113 and 114 constitute a color separation optical system that separates the light emitted from the light source 112 into red light, green light, and blue light.

Here, an integrator 121 and a polarization conversion element 122 are disposed between the dichroic mirror 113 and the light source 112 in order from the light source 112. The integrator 121 is configured to uniformize an illuminance distribution of the light emitted from the light source 112. In addition, the polarization conversion element 122 is configured to convert the light from the light source 112 into polarized light having a specific vibration direction such as s-polarized light.

The liquid crystal light valve 115 is a transmissive liquid crystal device 100 which modulates the red light that is transmitted by the dichroic mirror 113 and is reflected by a reflection mirror 123 according to an image signal. The liquid crystal light valve 115 includes a λ/2 retardation plate 115a, a first polarization plate 115b, a liquid crystal panel 115c, and a second polarization plate 115d. Here, the red light that is incident onto the liquid crystal light valve 115 is still s-polarized light because the polarization of the light is not changed even though the light is transmitted by the dichroic mirror 113.

The λ/2 retardation plate 115a is an optical element that converts the s-polarized light incident onto the liquid crystal light valve 115 into p-polarized light. In addition, the first polarization plate 115b is a polarization plate that blocks the s-polarized light and transmits the p-polarized light. The liquid crystal panel 115c is configured to convert the p-polarized light into s-polarized light (circularly polarized light or elliptically polarized light in a case of a halftone) by modulation according to an image signal. Moreover, the second polarization plate 115d is a polarization plate that blocks the p-polarized light and transmits the s-polarized light. Therefore, the liquid crystal light valve 115 is configured to modulate the red light according to the image signal and emit the modulated red light toward a cross dichroic prism 119.

The λ/2 retardation plate 115a and the first polarization plate 115b are disposed in a state of coming into contact with a transmissive glass plate 115e which does not change polarization, so that the λ/2 retardation plate 115a and the first polarization plate 115b can be avoided from being distorted due to heat generation.

A liquid crystal light valve 116 is a transmissive liquid crystal device 100 which modulates the green light that is reflected by the dichroic mirror 113 and is thereafter reflected by the dichroic mirror 114 according to the image signal. In addition, the liquid crystal light valve 116 includes, like the liquid crystal light valve 115, a first polarization plate 116b, a liquid crystal panel 116c, and a second polarization plate 116d. The green light incident onto the liquid crystal light valve 116 is s-polarized light that is incident by being reflected by the dichroic mirrors 113 and 114. The first polarization plate 116b is a polarization plate that blocks p-polarized light and transmits s-polarized light. In addition, the liquid crystal panel 116c is configured to convert the s-polarized light into p-polarized light (circularly polarized light or elliptically polarized light in a case of halftone) by modulation according to the image signal. In addition, the second polarization plate 116d is a polarization plate that blocks s-polarized light and transmits p-polarized light. Therefore, the liquid crystal light valve 116 is configured to modulate the green light according to the image signal and emit the modulated green light toward the cross dichroic prism 119.

The liquid crystal light valve 117 is a transmissive liquid crystal device 100 which modulates the blue light that is reflected by the dichroic mirror 113, is transmitted by the dichroic mirror 114, and passes through a relay system 120 according to the image signal. In addition, the liquid crystal light valve 117 includes, like the liquid crystal light valves 115 and 116, a λ/2 retardation plate 117a, a first polarization plate 117b, a liquid crystal panel 117c, and a second polarization plate 117d. Here, the blue light incident onto the liquid crystal light valve 117 becomes s-polarized light because the blue light is reflected by the dichroic mirror 113, is transmitted by the dichroic mirror 114, and is thereafter reflected by two reflection mirrors 125a and 125b described later in the relay system 120.

The λ/2 retardation plate 117a is an optical element that converts the s-polarized light incident onto the liquid crystal light valve 117 into p-polarized light. In addition, the first polarization plate 117b is a polarization plate that blocks s-polarized light and transmits p-polarized light. The liquid crystal panel 117c is configured to convert the p-polarized light into s-polarized light (circularly polarized light or elliptically polarized light in a case of a halftone) by modulation according to the image signal. Moreover, the second polarization plate 117d is a polarization plate that blocks the p-polarized light and transmits the s-polarized light. Therefore, the liquid crystal light valve 117 is configured to modulate the blue light according to the image signal and emit the modulated blue light toward the cross dichroic prism 119. In addition, the λ/2 retardation plate 117a and the first polarization plate 117b are disposed to be in a state of overlapping with a glass plate 117e.

The relay system 120 includes relay lenses 124a and 124b and the reflection mirrors 125a and 125b. The relay lenses 124a and 124b are provided to prevent light losses caused by a long light path of the blue light. Here, the relay lens 124a is disposed between the dichroic mirror 114 and the reflection mirror 125a. In addition, the relay lens 124b is disposed between the reflection mirrors 125a and 125b. The reflection mirror 125a is disposed to reflect the blue light that is transmitted by the dichroic mirror 114 and is emitted from the relay lens 124a toward the relay lens 124b. In addition, the reflection mirror 125b is disposed to reflect the blue light emitted from the relay lens 124b toward the liquid crystal light valve 117.

The cross dichroic prism 119 is a color synthesizing optical system in which two dichroic films 119a and 119b are disposed to intersect in an X shape. The dichroic film 119a is a film that reflects blue light and transmits green light, and the dichroic film 119b is a film that reflects red light and transmits green light. Therefore, the cross dichroic prism 119 is configured to synthesize the red light, the green light, and the blue light respectively modulated by the liquid crystal light valves 115 to 117 and emit the synthesized light toward a projection optical system 118.

In addition, light incident onto the cross dichroic prism 119 from the liquid crystal light valves 115 and 117 is s-polarized light, and light incident onto the cross dichroic prism 119 from the liquid crystal light valve 116 is p-polarized light. Light incident onto the cross dichroic prism 119 as described above is polarized into different kinds, so that light incident onto the cross dichroic prism 119 from the liquid crystal light valves 115 to 117 can be synthesized. Here, in general, the dichroic films 119a and 119b have excellent reflection transistor characteristics of s-polarized light. Therefore, the red light and the blue light reflected by the dichroic films 119a and 119b are s-polarized light, and the green light transmitted by the dichroic films 119a and 119b is p-polarized light. The projection optical system 118 has a projection lens (not shown) and is configured to project the light synthesized by the cross dichroic prism 119 onto the screen 111.

Second Example of Projection-Type Display Apparatus

A projection-type display apparatus 1000 illustrated in FIG. 11B has a light source unit 1021 that generates source light, a color separation light guide optical system 1023 that separates the source light emitted from the light source unit 1021 into red, green, and blue beams, and a light modulation unit 1025 illuminated with the source light with each color emitted from the color separation light guide optical system 1023. In addition, the projection-type display apparatus 1000 includes a cross dichroic prism 1027 (synthesizing optical system) that synthesizes image light with each color emitted from the light modulation unit 1025, and a projection optical system 1029 for projecting the image light that passes through the cross dichroic prism 1027 onto a screen (not shown).

In the projection-type display apparatus 1000, the light source unit 1021 includes a light source 1021a, a pair of fly-eye optical systems 1021d and 1021e, a polarization converting member 1021g, and a superimposing lens 1021i. In this embodiment, the light source unit 1021 includes a reflector 1021f made of a paraboloid surface so as to emit parallel light. The fly-eye optical systems 1021d and 1021e are made of a plurality of element lenses disposed in a matrix form on a surface orthogonal to a system optical axis such that the source light is separated by the element lenses so as to be individually converged and diverged. The polarization converting member 1021g converts the source light emitted from the fly-eye optical system 1021e into, for example, only a p-polarized component which is parallel to the figure so as to be supplied to an optical path downstream side optical system. The superimposing lens 1021i appropriately converges the source light passing through the polarization converting member 1021g as a whole so that a plurality of liquid crystal devices 100 provided in the light modulation unit 1025 are each subjected to uniform superimposed illumination.

The color separation light guide optical system 1023 includes a cross dichroic mirror 1023a, a dichroic mirror 1023b, and reflection mirrors 1023j and 1023k. In the color separation light guide optical system 1023, substantially white source light from the light source unit 1021 is incident onto the cross dichroic mirror 1023a. Red (R) light reflected by a first dichroic mirror 1031a which is one mirror included in the cross dichroic mirror 1023a is reflected by the reflection mirror 1023j, is transmitted by the dichroic mirror 1023b, and via an incident side polarization plate 1037r, a wire grid polarization plate 1032r that transmits p-polarized light and reflects s-polarized light, and an optical compensation plate 1039r, is incident onto the liquid crystal device 100 for red (R) while being p-polarized light.

In addition, green (G) light emitted by the first dichroic mirror 1031a is reflected by the reflection mirror 1023j, is thereafter reflected by the dichroic mirror 1023b, and via an incident side polarization plate 1037g, a wire grid polarization plate 1032g which transmits p-polarized light and reflects s-polarized light, and an optical compensation plate 1039g, is incident on a liquid crystal device 100 for green (G) while being p-polarized light.

On the other hand, blue (B) light reflected by a second dichroic mirror 1031b which is the other mirror included in the cross dichroic mirror 1023a is reflected by the reflection mirror 1023k, and via an incident side polarization plate 1037b, a wire grid polarization plate 1032b which transmits p-polarized light and reflects s-polarized light, and an optical compensation plate 1039b, is incident onto the liquid crystal device 100 for blue (B) while being p-polarized light.

In addition, the optical compensation plates 1039r, 1039g, and 1039b optically compensate characteristics of liquid crystal layer by adjusting polarized states of light incident onto and emitted from the liquid crystal device 100.

In the projection-type display apparatus 1000 configured as described above, light beams with three colors respectively incident via the optical compensation plates 1039r, 1039g, 1039b are modulated by the corresponding liquid crystal devices 100. AT this time, from the modulated light emitted from the liquid crystal device 100, light with the s-polarized component is reflected by the wire grid polarization plates 1032r, 1032g, and 1032b, and via emission side polarization plates 1038r, 1038g, and 1038b, is incident on the dichroic prism 1027. In the cross dichroic prism 1027, a first dielectric multi-layer film 1027a and a second dielectric multi-layer film 1027b which cross in an X shape are formed. The first dielectric multi-layer film 1027a which is the one film reflects R light and the second dielectric multi-layer film 1027b which is the other film reflects B light. Therefore, the light beams with three colors are synthesized by the cross dichroic prism 1027 so as to be emitted to the projection optical system 1029. In addition, the projection optical system 1029 projects image light with color synthesized by the cross dichroic prism 1027 onto a screen (not shown) at a desired magnification.

Other Projection-type Display Apparatus

In addition, the projection-type display apparatus may also have a configuration in which LED light sources and the like that emit light beams with colors as light source units and the color light beams emitted from the LED light sources are supplied to other liquid crystal devices.

Other Electronic Apparatus

In an electronic apparatus such as a portable telephone, an information portable terminal (Personal Digital Assistants (PDA)), a digital camera, a liquid crystal television, a car navigation device, a television telephone, a POS terminal, or an apparatus including a touch panel, besides the electronic apparatus described above, the liquid crystal device 100 to which the embodiment of the invention is applied may be used as a direct-view display device.

This application claims priority from Japanese Patent Application No. 2011-062554 filed in the Japanese Patent Office on Mar. 22, 2011, the entire disclosure of which is hereby incorporated by reference in its entirely.

What is claimed is:

1. A liquid crystal device comprising:
   an element substrate provided with, on one surface side, an image display region in which a plurality of pixel electrodes are arranged;
   a counter substrate provided with a common electrode to which a common potential is applied;
   a seal material which bonds the element substrate and the counter substrate to each other, the seal material having a liquid crystal injection opening which is disposed between a first side of the element substrate and the image display region;
   a sealing material which seals the liquid crystal injection opening through which liquid crystals are injected into a region surrounded by the seal material;
   a liquid crystal layer which is held in the region surrounded by the seal material between the element substrate and the counter substrate; and
   a peripheral electrode which is provided in the element substrate so as to extend along the seal material in a peripheral region interposed between the image display region and the seal material, and to which a potential is applied that is different from the common potential,
   wherein
      the peripheral electrode includes a first portion and a second portion,
      the first portion is disposed between the sealing material and the image display region, the first portion extending along the first side of the element substrate so as to have an electrode width Wb in a direction intersecting with the first side of the element substrate,
      the second portion is disposed between the seal material and the image display region, the second portion extending along a second side of the element substrate so as to have an electrode width Wa in a direction intersecting with the second side of the element substrate,
      the second side of the element substrate is a side other than the first side of the element substrate, and
      the electrode width Wb is greater than the electrode width Wa.

2. The liquid crystal device according to claim 1, wherein the peripheral electrode includes a third portion, the third portion is disposed between the seal material and the image display region, the third portion extending along a third side of the element substrate so as to have an electrode width Wc in a direction intersecting with the third side of the element substrate, the third side of the element substrate is a side other than the first side and the second side of the element substrate, and a width of the peripheral region overlapped with the third portion is smaller than a width of the peripheral region overlapped with the second portion.

3. The liquid crystal device according to claim 2, wherein the electrode width Wc is equal to the electrode width Wb.

4. The liquid crystal device according to claim 1, wherein the element substrate includes an inorganic alignment film, and
   the liquid crystal layer includes a nematic liquid crystal compound with negative dielectric anisotropy.

5. A projection-type display apparatus which includes the liquid crystal device according to claim 1, comprising:
   a light source unit that emits light supplied to the liquid crystal device; and
   a projection optical system that projects light modulated by the liquid crystal device.

6. The liquid crystal device according to claim 1, wherein the second side of the element substrate is an opposite side of the first side of the element substrate.

7. A liquid crystal device comprising:
   a first substrate that has a plurality of pixel electrodes within a pixel region,
   a second substrate that has a common electrode,
   a seal material that bonds the first substrate and the second substrate, the seal material being disposed between the pixel region and an edge of the second substrate, the seal material having a first edge and a second edge;
   a sealant that seals between the first edge and the second edge; and
   a liquid crystal layer that is held in a region surrounded by the seal material and the sealant between the first substrate and the second substrate,
   wherein
      the first substrate has an electrode extending along the seal material and the sealant,
      the electrode has a first portion and a second portion,
      the first portion is disposed between the seal material and the pixel region, the first portion extending along a first side of the first substrate,
      the second portion is disposed between the sealant and the pixel region, the second portion extending along a second side of the first substrate, and
      a width of the second portion in a direction intersecting with the second side of the first substrate is wider than a width of the first portion in a direction intersecting with the first side of the first substrate.

* * * * *